US012578315B2

(12) United States Patent
Krummen et al.

(10) Patent No.: US 12,578,315 B2
(45) Date of Patent: Mar. 17, 2026

(54) INTERFACE SYSTEM AND CORRESPONDING METHOD

(71) Applicant: Thermo Fisher Scientific (Bremen) GmbH, Bremen (DE)

(72) Inventors: Michael Krummen, Bad Zwischenahn (DE); Daniel Felsmann, Stuhr (DE)

(73) Assignee: Thermo Fisher Scientific (Bremen) GmbH, Bremen (DE)

( * ) Notice: Subject to any disclaimer, the term of this patent is extended or adjusted under 35 U.S.C. 154(b) by 302 days.

(21) Appl. No.: 17/083,797

(22) Filed: Oct. 29, 2020

(65) Prior Publication Data

US 2021/0132010 A1 May 6, 2021

(30) Foreign Application Priority Data

Oct. 30, 2019 (GB) ...................................... 1915721

(51) Int. Cl.
| | |
|---|---|
| *G01N 30/32* | (2006.01) |
| *G01N 30/02* | (2006.01) |
| *G01N 30/72* | (2006.01) |

(52) U.S. Cl.
CPC ......... *G01N 30/32* (2013.01); *G01N 30/7233* (2013.01); *G01N 2030/027* (2013.01)

(58) Field of Classification Search
CPC ............... G01N 30/32; G01N 30/7233; G01N 2030/027; G01N 30/40; G01N 2030/402;
(Continued)

(56) References Cited

U.S. PATENT DOCUMENTS

| | | | | |
|---|---|---|---|---|
| 8,448,493 | B2 * | 5/2013 | McIntyre et al. .. | G01N 30/7206 73/23.37 |
| 8,578,755 | B2 * | 11/2013 | Krummen et al. .... | G01N 31/12 73/23.37 |

(Continued)

FOREIGN PATENT DOCUMENTS

| | | |
|---|---|---|
| DE | 102004010969 A1 | 9/2005 |
| DE | 102005049152 A1 | 4/2007 |

(Continued)

OTHER PUBLICATIONS

Krummen, Michael, et al. "A new concept for isotope ratio monitoring liquid chromatography/mass spectrometry." Rapid Communications in Mass Spectrometry 18.19 (2004): 2260-2266. (Year: 2004).*

(Continued)

*Primary Examiner* — Jill A Warden
(74) *Attorney, Agent, or Firm* — ALG Intellectual Property, LLC

(57) ABSTRACT

The present disclosure relates to a method performed in an interface system, the interface system comprising a reactor and a reaction-product-separator, the method comprising: (a) guiding a liquid containing analytes to and through the reactor and causing a component comprised by the analytes to react to a reaction product in the reactor, to thus create a post-reactor liquid comprising the reaction product, (b) guiding the post-reactor liquid from the reactor to the reaction-product-separator and through the reaction-product-separator, and separating the reaction product from the post-reactor liquid, to thus create a post-separator fluid, and (c) guiding at least one rinsing liquid through at least one of the reactor and the reaction-product-separator. The present invention also relates to an interface system, wherein the system is configured to perform the method, wherein the
(Continued)

interface system comprises the reactor and the reaction-product-separator.

19 Claims, 3 Drawing Sheets

(58) Field of Classification Search
CPC ........... G01N 2030/8868; G01N 30/84; G01N 30/02; G01N 30/06; G01N 2030/067; H01J 49/0431
See application file for complete search history.

(56) References Cited

U.S. PATENT DOCUMENTS

| | | | | |
|---|---|---|---|---|
| 2003/0057152 A1* | 3/2003 | Haridas | .................... | C02F 3/301 |
| | | | | 210/603 |
| 2003/0226394 A1 | 12/2003 | Hilkert et al. | | |
| 2007/0095675 A1* | 5/2007 | Krummen et al. | .......................... | |
| | | | | G01N 33/0037 |
| | | | | 205/464 |
| 2008/0179244 A1* | 7/2008 | Morgan et al. | ........ | B01D 65/02 |
| | | | | 210/636 |
| 2011/0195430 A1* | 8/2011 | Lopez-Ferrer | ..... | G01N 33/6803 |
| | | | | 435/7.1 |
| 2014/0069167 A1 | 3/2014 | Krummen et al. | | |
| 2015/0300542 A1* | 10/2015 | Graham | .............. | F16L 19/0206 |
| | | | | 285/393 |
| 2017/0336374 A1* | 11/2017 | Guzzonato | ............. | G01N 30/62 |
| 2018/0050938 A1* | 2/2018 | Duta | ..................... | C02F 1/5245 |

FOREIGN PATENT DOCUMENTS

| | | | | | |
|---|---|---|---|---|---|
| GB | 2431168 A | | 4/2007 | | |
| JP | 57179649 A | * | 11/1982 | ............. | G01N 30/74 |
| JP | 6415653 A | | 1/1989 | | |
| JP | 5973764 B2 | | 8/2016 | | |
| WO | 8909486 A1 | | 10/1989 | | |
| WO | WO 2011090978 A1 | * | 7/2011 | | |

OTHER PUBLICATIONS

Majors, Ronald E. "The cleaning and regeneration of reversed-phase HPLC columns." LC GC North America 21.1 (2003): 19-27. Accessed Oct. 13, 2022. <https://cdn.sanity.io/files/0vv8moc6/chroma/bad1ab2a45ce4f7c16aa08f343c168ed8a12a4aa.pdf/article-45058.pdf> (Year: 2003).*

Quang Do, Vinh et al. "Integration of a micro reactor system to a ICP mass spectrometer." 2017 IEEE International Instrumentation and Measurement Technology Conference (I2MTC). IEEE, 2017. (Year: 2017).*

M. Radke, H. Willsch, and D.H. Welte. Preparative hydrocarbon group type determination by automated medium pressure liquid chromatography. Analytical Chemistry 1980, 52 (3), p. 406-411. DOI: 10.1021/ac50053a009.*

Thermo Fisher Scientific, 2008, "Thermo Scientific LC IsoLink", thermofisher.com, [online], Available from: https ://assets. thermofisher. com/TF S-Assets/CMD/brochures/BR-3 003 9-IRMS-LC-IsoLink-BR3 003 9-EN. pdf [Accessed Apr. 29, 2020], See p. 5.

Analyst, vol. 134, 2009, Muccio et al., "Isotope ratio mass spectrometry", pp. 213-222, See figure 2.

Analytical chemistry, vol. 90 (3), 2018, Wang et al., "Automated Online Solid-Phase Derivatization for Sensitive Quantification of Endogenous S-Nitrosoglutathione and Rapid Capture of Other Low-Molecular-Mass S-Nitrosothiols", pp. 1967-1975, See abstract, figures B1-B4.

Combined Search and Examination Report dated May 11, 2020, to GB Patent Application No. 1915721.3.

Extended EP Search Report dated Mar. 15, 2021, mailed to EP Patent Application No. 20204558.9.

* cited by examiner

INTERFACE SYSTEM AND CORRESPONDING METHOD

CROSS-REFERENCE TO RELATED APPLICATION

This application claims the priority to GB Patent Application No. 1915721.3, filed on Oct. 30, 2019, which is hereby incorporated herein by reference in its entirety.

TECHNICAL FIELD

The invention lies in the field of analyzing samples. In particular, the invention will be described with reference to mass-spectrometry and more particularly with reference to isotope-ratio mass spectrometry (IRMS). In one aspect, the invention relates to an interface system for IRMS of analytes separated via a chromatography system. More particularly, the present invention relates to an interface system for IRMS of analytes separated via liquid chromatography (LC), a method performed in such an interface system and corresponding use of the interface system.

BACKGROUND

Isotope-ratio mass spectrometry (IRMS) is a specialization of mass spectroscopy, which may allow to measure a relative abundance of different isotopes of particular chemical elements present in a sample. IRMS techniques may be used to measure ratios of isotopes of, for example, hydrogen, carbon, nitrogen and oxygen, such as $^2H/^1H$, $^{13}C/^{12}C$, $^{15}N/^{14}N$, $^{18}O/^{16}O$, etc. Typically, the analytes for IRMS are separated via chromatography, e.g. liquid chromatography (LC). Moreover, the liquid chromatography may be coupled to an interface system, which may couple the LC to an IRMS. Such a combination of techniques may be suitable for determination of isotopes ratios, e.g. for measuring the ratio of $^{13}O/^{12}O$ of organic compounds, which may allow measuring small changes in the $^{13}C$ abundance in individual analyte species. For this purpose, the (e.g., complete) amount of carbon contained in an analyte may be quantitatively converted into a given molecule, e.g. $CO_2$, while the analyte is still dissolved in a mobile phase, e.g. an aqueous liquid phase. Such a conversion may comprise a chemical reaction, e.g. an oxidation, which may be accomplished in solution via addition of an agent, e.g. sodium peroxodisulfate. The chemical reaction may be carried out inside of a reactor, e.g. an oxidation reactor.

IRMS is widely used for analysis of amino acids, carbohydrates and a plurality of drugs. For instance, one of the key applications of IRMS is the analysis of samples of honey to determine whether the sample has been adulterated, e.g. with addition of invert sugar syrups from various C3 and C4 plant sources.

However, IRMS typically comprises interface systems with sensitive components, which are prone to clogging. For instance, sensitive components of interface systems are reactors or separation components, such as exchanger membranes, which have small inner diameters to ensure fast and efficient reaction and exchange. Some causes for clogging of components of interface systems may comprise clogging due to small particles which may either be introduced with the analyte and/or employed reagents, or due to (small) particles produced in situ by unwanted chemical reactions, e.g. as a result of a reaction of ions in the liquid that may lead to insoluble products such as formation of $CaSO_4$.

There are several approaches proposed for eliminating or reducing particles from entering the interface system. However, occurrence of unwanted chemical reaction, e.g. in reactors, may still not fully be prevented.

DE102004010969 refers to a method for an isotope ratio analysis comprising analyzing a substance present in or as fluid solution, leading a first part of the solution over a fluid chromatograph, and producing gas from the eluate of the fluid chromatograph (in the presence of eluate) in a gas production unit, supplying the gas for analysis, producing gas from a second part of the solution in the gas production unit and supplying the gas for analysis.

DE102005049152 refers to a method and a device for providing a substance for analysis of isotopic ratios, wherein at least some of the substance is in a liquid phase. According to DE102005049152, the liquid phase is subjected to electrolysis, and thereby the substance or a precursor thereof is formed.

GB2431168 refers to a process and apparatus that provides a substance for isotopic ratio analysis. The method comprises generating gas from a sample within the eluate of a liquid chromatograph, reducing and/or oxidizing the eluate via an electrolysis cell and subsequently supplying the gas generated to an IRMS instrument for isotopic ratio analysis. The substance or precursor of the substance may be present in the liquid phase of the eluent and the electrolysis process may generate the substance or precursor of the substance. Additives may be added to the process to improve the conductivity of the eluent in the cell.

Although the prior art methods and devices described above generally function well, it has been found that clogging may occur when they are used continuously for several days, in particular in some applications, such as when analyzing honey.

SUMMARY

Generally, it is an object of the present invention to overcome or at least to alleviated the shortcomings and disadvantages of the prior art. More particularly, it is an object of the present invention to provide a technology less prone to failure for preparation of samples supplied by a chromatography unit for use in an analytical device.

At least some of these objects are met by the present invention.

In a first aspect, the present invention relates to a method performed in an interface system, the interface system comprising a reactor and a reaction-product-separator, the method comprising: (a) guiding a liquid containing analytes to and through the reactor and causing a component comprised by the analytes to react to a reaction product in the reactor, to thus create a post-reactor liquid comprising the reaction product, (b) guiding the post-reactor liquid from the reactor to the reaction-product-separator and through the reaction-product-separator, and separating the reaction product from the post-reactor liquid, to thus create a post-separator fluid, and (c) guiding at least one rinsing liquid through at least one of the reactor and the reaction-product-separator. The reactor may be a chemical reactor.

In other words, the present invention relates to a method that may be executed in an interface system which may comprise a plurality of components, such as, for example, the reactor and the reaction-product separator.

For instance, in step (a) the liquid comprising analyte(s) may be guided to and through the reactor, wherein the analyte(s) may be transformed into another type of substance(s), i.e. a different chemical species. In some instances, such a transformation may be advantageous, as it may supply the analyte in a more easy-to-analyze state. E.g. in the case of analytes with high complexity, such as sugars, and/or proteins, it may be more suitable to transform them into simpler molecules, which may further be more suitable for given analytical techniques capable of providing specific information as regards the composition of the analytes. For example, when analyzing analytes comprising sugars, it may be more suitable for isotope-ratio analysis to convert the sugars into smaller carbon-containing molecules, such as carbon dioxide. For example, this can be achieved by oxidizing the carbons contained in the sugars to carbon dioxide.

Further, it will be understood that in such a reaction, not only the reaction product intended for further analysis (e.g., carbon dioxide) may be generated, but also other by-products. Furthermore, it is also possible that some components do not react at all in the reactor. In light thereof, in some instances, the approach of step (b) may be advantageous, as it may allow to separate the analytes intended for further analysis from any by-products, which may further allow to selectively analyze a specific property of interest, for instance, when transforming analytes comprising sugars, besides obtaining smaller carbon-containing molecules, e.g. carbon dioxide, a plurality of other smaller molecules may also be generated as by-products, e.g. nitrogen-containing molecules, which may be of no interest. Step (b) may allow to separate such by-products from the reaction product of interest, before subjecting an analytical technique.

Furthermore, step (c) may be advantageous, as when executing steps (a) and/or (b), a plurality of substances, including solvents, may come in contact with components of the interface system. Some of these substances may be retained in the interface system due to diverse processes, e.g. deposition, which may be required to be removed in order to avoid failure of the interface system. Moreover, step (c) may also be advantageous, as it may allow rinsing the interface system before introducing a subsequent liquid, such as a different liquid comprising analytes.

In one embodiment, the at least one rinsing liquid may comprise a reactor rinsing liquid, and step (c) may comprise guiding the reactor rinsing liquid through the reactor, which may enter the reactor with a pressure of at least 1 bar, preferably at least 50 bar, such as 100 bar, and with a flow rate of at least 0.1 mL/min, preferably at least 1 mL/min, such as 2 mL/min.

In a further embodiment, the at least one rinsing liquid may comprise a reaction-product separator (RPS) rinsing liquid, and step (c) may comprise guiding the RPS rinsing liquid through the reaction-product-separator, which may enter the reaction-product-separator with a pressure not exceeding 10 bar, preferably not exceeding 6 bar, such as 1 bar and with a flow rate lower than 3 mL/min, preferably lower than 1.0 mL/min, but higher than 0.1 mL/min, preferably higher than 0.3 mL/min.

Furthermore, the at least one rinsing liquid may comprise a reactor-RPS rinsing liquid, and step (c) may comprise guiding the reactor-RPS rinsing liquid through the reactor and through the reaction-product-separator, which may be guided through the reactor and the reaction-product-separator with a pressure not exceeding 10 bar, preferably not exceeding 6 bar, such as 1 bar and with a flow rate lower than 3 mL/min, preferably lower than 1.0 mL/min, but higher than 0.1 mL/min, preferably higher than 0.3 mL/min.

In step (a), the liquid containing analytes may be guided through the reactor in a reactor direction.

In step (b), the post reactor liquid may be guided through the reaction-product-separator in a separator direction.

In step (c), at least a portion of the at least one rinsing liquid may be guided through at least one of the reactor and the reaction-product-separator in a rinsing direction.

In one embodiment, the rinsing direction may be identical to the reactor direction and/or the separator direction.

In another embodiment, the rinsing direction may be opposite to the reactor direction and/or the separator direction, which in some instances may be advantageous, as it may allow rinsing components of the interface system with a reverse flow, which may be particularly beneficial for removing substances that may have been deposited on the components of the interface system and that may lead to clogging of the interface system.

In one embodiment, the method may comprise triggering step (c) which may comprise manually triggering step (c) and/or automatically triggering step (c).

The automatically triggering may comprise triggering step (c) at a time t after an analytical run. This may be advantageous, as it may allow to execute the step (c) after the analytical run has been completed, which may be avoid contaminating the liquid of the analytical run with a rising liquid.

The method may comprise using a mobile phase for guiding the liquids in steps (a), (b) and (c), wherein the mobile phase may comprise one or more solvents.

In one embodiment, the mobile phase in step (c) may be the same as in the steps (a) or (b).

In another embodiment, the mobile phase in step (c) may be different than in steps (a) or (b).

The mobile phase for guiding the reactor rinsing liquid may be the same as the mobile phase for guiding the RPS rinsing liquid.

In another embodiment, the mobile phase for guiding the reactor rinsing liquid may be different than the mobile phase for guiding the RPS rinsing liquid.

The mobile phase for guiding the reactor rinsing liquid may be the same as the mobile phase for guiding the reactor-RPS rinsing liquid.

In another embodiment, the mobile phase for guiding the reactor rinsing liquid may be different than the mobile phase for guiding the reactor-RPS rinsing.

The mobile phase for guiding the RPS rinsing liquid may be the same as the mobile phase for guiding the reactor-RPS rinsing liquid.

In one embodiment, the mobile phase for guiding the RPS rinsing liquid may be different than the mobile phase for guiding the reactor-RPS rinsing.

In other words, embodiments of the present invention may make use of same mobile phases for different steps as well as different mobile phase compositions. For example, using the same mobile phase may in some instances be advantageous. For example, using a mobile phase comprising the same composition may lead to remnants of step (a) and/or (b) being easily removed, as issues of solvent-analyte affinity may be avoided, i.e. the solubility of any analytes comprised by the liquid may not be affected.

However, in other embodiments, different mobile phase compositions may be used for the different steps.

For example, using a mobile phase for step (c) having another composition than the mobile phase in steps (a) and/or (b) may be advantageous, as it may allow introducing a rinsing liquid capable of dissolving and/or removing any substances that may have been deposited during the execution of a previous step, e.g. step (a) and/or (b), such as the formation of by-products that may be insoluble in the mobile phase used in the previous step, e.g. step (a) and/or (b).

The method may comprise detecting a need for cleaning, which may comprise monitoring at least one of: a pressure of a liquid in the interface system, a flow rate of a liquid in the interface system, a droplet rate at an outlet of the interface system, a particle load of a liquid in the interface system, a chemical composition of a liquid in the interface system, and at least one physical parameter of a liquid in the interface system.

In other words, due to a low, continuous flow that may be applied in the interface system, no continuous liquid flow out of the interface system may be achieved, instead droplets may be formed at an outlet of the interface system, which may drip regularly out of the outlet of the interface system, and therefore, it may be possible to monitor the droplet rate. Therefore, besides or instead of detecting the flow continuously inside of the tubing system, the droplet rate may be detected, e.g., by means of a drop detection sensor.

This approach may be advantageous, as it may allow to monitor a plurality of parameters of the interface system, for example, the interface system may be set to monitor the pressure of a liquid in the interface system and may further comprise setting a pressure indicator to a percentage pressure increase of a starting pressure of the interface system. This may be particular advantageous to monitor changes in parameters, e.g. pressure, and eventually, these changes may be used to implement further measures explained herein (e.g., triggering a rinsing procedure).

The pressure of a liquid may be monitored via a pressure meter unit.

In one embodiment, the pressure meter unit may comprise a pressure transducer.

In one embodiment, the flow rate of the liquid may be monitored via a flow meter unit.

In one embodiment, the drop at the outlet may be monitored via a drop detection sensor unit.

In one embodiment, the particle load of the liquid may be monitored via a light scattering (LS) technique.

In one embodiment, the light scattering technique may be dynamic light scattering (DLS), which may be advantageous, as the DLS may only require sampling small volumes of liquid, e.g. few microliters, which may be particularly beneficial to measure changes of the liquid's properties even after only a small volume of liquid has been (pre)treated in the interface system. Furthermore, DLS may be particularly beneficial for monitoring small particles, with accuracy and reproducibility of approximately 5 nm and above, which may allow detecting risk of clogging as an early stage.

In one embodiment, the particle load of the liquid may be monitored via an absorption technique.

In one embodiment, the absorption technique may be light obscuration.

In one embodiment, the chemical composition of the liquid may be monitored using at least one of: ion selective electrodes, UV-Vis (ultraviolet-visible) absorption spectroscopy, and IR (infrared) absorption spectroscopy.

In one embodiment, the physical parameters may comprise at least one of: thermal conductivity, and electrical conductivity.

Automatically triggering may comprise triggering the step (c) when detecting the need for cleaning.

For example, a detection parameter may be measured and compared to a trigger threshold and step (c) may be automatically triggered depending on the comparison.

Manually triggering may comprise prompting an input of a user for triggering the step (c) when detecting the need for cleaning.

The method may comprise detecting a blocked flow at one or more components of the interface system, which in some instances may be particularly beneficial, as it may allow to identify which component or components of the interface system may require a rinsing, and further, it may allow to select the mobile phase for rinsing the identified component (s).

The method may comprise detecting the reaction product separated in step (b).

The method may be for rinsing at least one component of the interface system.

The method may be for wetting at least one component of the interface system, which may be particularly beneficial for, for instance, but not limited to, keeping components of the interface system wetted when no analytical runs are being performed, which may further increase the lifetime of the components of the interface system. Moreover, wetting of components may, for example, be initialized before an analytical run, which may allow to set parameters of the interface system ready for the analytical run, e.g. it may allow to set and/or keep the interface system to a given temperature range.

The method may comprise executing the steps (a) and (b) in the interface system as steps of the analytical run.

In a second aspect, the present invention relates to an interface system, wherein the system is configured to perform method as recited herein, wherein the interface system may comprise the reactor and the reaction-product-separator.

The interface system may comprise a mixing unit configured to receive and mix at least two incoming liquids, and to provide a mixed liquid, wherein the interface system may be further configured to supply the mixed liquid as the liquid containing analytes to the reactor. The mixing unit may encounter a plurality of applications that may contribute to the liquid (pre)treatment in the interface system. For example, it may allow to supply to the liquid an oxidizing component, which may facilitate the oxidation of the analyte comprised by the liquid, so that the reaction in the reactor may be promoted and/or accelerated.

In one embodiment, the interface system may comprise a inlet filter unit.

In one embodiment, the inlet filter unit may comprise a guard column, which may be advantageous, as it may allow to intercept contaminants present in the liquid before entering the components of the interface system further downstream, which may, inter alia, allow avoiding clogging of the interface system. Furthermore, a guard column may be advantageous as it may be used to remove unwanted (ionic) components from the mobile phase of an HPLC system. For instance, a guard column may be used as an inlet filter unit to "guard" the downstream components from ions from buffer solutions that would damage downstream components. Such components can be trapped by the guard column.

In another embodiment, the inlet filter unit may comprise a suppressor unit. The suppressor may in some instances be particularly advantageous. For instance, ions from buffer solutions that may damage an analytic column may trapped via a guard column. However, the guard column may possess a specific capacity for trapping ions. Once this capacity is reached, it may be needed to regenerate the guard column via (in almost all cases) backflushing with a regeneration reagent. This means that the analytic process needs to be interrupted for regeneration when using a guard column. However, the suppressor unit may supply substantially the same functions as a guard column, but have the advantage that the suppressor unit may comprise an exchange membrane so that it can be regenerated continuously by a steady counterflow with regeneration reagent at the outside of the active membrane.

In one embodiment, the inlet filter unit may comprise a filtering element.

In one embodiment, the interface system may comprise a reactor filter unit.

In one embodiment, the reactor filter unit may be located between the mixing unit and the reactor, which may be particularly advantageous for avoiding and/or reducing insoluble by-products that may be generated from mixing liquids in the mixing unit to enter the reactor.

In one embodiment, the reactor filter unit may comprise a filtering element.

The reactor filter unit may comprise a guard column.

The interface system may comprise a first switching valve configured to assume at least two operational states.

In one embodiment, the interface system may comprise a second switching valve configured to assume at least two operational states.

Furthermore, the interface system may comprise a closing valve configured to assume an open and a closed state.

In one embodiment, the interface system may comprise a flow-switching valve configured to assume a first operational state (P) and a second operational state (C).

In one embodiment, the flow-switching valve may comprise a first connector, a second connector, a third connector, and a fourth connector, and in the first operational state (P) of the flow-switching valve, the first connector may be connected to the third connector and the second connector may be connected to the fourth connector, and in the second operational state (C) of the flow-switching valve, the first connector may be connected to the fourth connector and the second connector may be connected to the third connector.

In simple words, the flow-switching valve may in some instances be advantageous, as it may allow to control a path that a liquid may follow, e.g. it may allow to guide a liquid from the first connector to the third connector, which the interface system may use to generate a plurality of paths for different liquids.

The interface system may comprise a waste collector.

The interface system may comprise a monitoring unit arranged downstream the closing valve and upstream the waste collector.

The interface system may comprise an inlet coupling for coupling the system with a chromatography unit. It should be understood that the interface system may also be used in conjunction with a manual sample injection.

The interface system may comprise a plurality of coupling tubings including a first tubing arranged between the first switching valve and the second switching valve, a second tubing arranged between the first switching valve and the closing valve, a third tubing arranged between the first switching valve and the mixing unit, a fourth tubing arranged between the mixing unit and the reactor, a fifth tubing arranged between the reactor and the second switching valve, a sixth tubing arranged between the second switching valve and the waste collector, a seventh tubing arranged between the second switching valve and the reaction-product separator, and an eighth tubing arranged between the reaction-product separator and the closing valve.

In one embodiment, the first switching valve may be configured to assume a first operational state (A), wherein the mixing unit may be fluidly connected to the chromatography unit, and the first tubing and the second tubing may be connected to dead-ends, respectively; and a second operational state (B), wherein the chromatography unit may be fluidly connected to the first tubing, and the mixing unit may be fluidly connected to the second tubing.

The second switching valve may be configured to assume a first operational state (A), wherein the reactor may be fluidly connected to the reaction-product separator; and a second operational state (B), wherein the reactor may be fluidly connected to the first tubing.

In other words, the first and the second switching valve assuming either a first operational state (A) or a second operational state (B) may be particular advantageous, as it may allow the interface system to guide a liquid through the components according to the step that may be required to be executed, e.g. the first switching valve assuming the first operational state (A) may allow to guide the liquid from the chromatography unit to the mixing unit The monitoring unit (122) may comprise at least one of: a pressure meter, a flowmeter, an ion-selective electrode, a UV-Vis absorption spectrometer, an IR absorption spectrometer, a LS spectrometer, an electrical conductivity meter, and a thermal conductivity meter.

The reactor may comprise an inner flow length in the range of 1 to 10 m, preferably 2 to 8 m, such as 4 m.

The reactor may comprise an inner flow diameter in the range of 100 to 1,200 mm, preferably between 500 to 800 $\mu$m, such as 635 $\mu$m. In other embodiments, the inner flow diameter may also be in the range of 150 $\mu$m to 500 $\mu$m, such as 250 $\mu$m.

The reaction-product separator may comprise a separator membrane.

The separator membrane may comprise a polymer-electrolyte membrane.

The separator membrane may comprise membrane tubes.

The separator membrane may be a $CO_2$-separation membrane.

The reactor may be an oxidation reactor.

The reaction-product-separator may be configured to separate carbon dioxide from the post-reactor liquid.

The method may be performed by the interface system as recited herein, wherein in steps (a) and (b), the interface system assumes a first configuration, wherein the reactor and the reaction-product-separator may be fluidly connected, and in step (c), the system assumes at least a second configuration, which may be different from the first configuration.

In step (c) the at least second configuration may comprise the system assuming a reactor-rinsing configuration, wherein in the reactor-rising configuration, the reactor rinsing liquid may be not guided through the reaction-product-separator.

In one embodiment, in step (c) the at least second configuration may comprise the system assuming a RPS-rinsing configuration, wherein in the RPS-rising configuration, the RPS rinsing liquid may be not guided through the reactor.

In another embodiment, a pressure of a liquid in the interface system may be monitored via the chromatography unit. For instance, the pressure of a liquid in the interface system may be monitored via internal components, which may comprise monitoring, for example, an internal pressure of a purge valve, an external pressure from the chromatography unit, or the pressure monitored by a separate pressure sensor.

In one embodiment, the method may be performed by interface system as recited herein, wherein the flow-switching valve may be in the second operational state, when the RPS rinsing liquid may be guided through the reaction-product-separator.

In another embodiment, the method may be performed by interface system as recited herein, wherein the flow-switching valve may be in the first operational state, when the reactor rinsing liquid may be guided through the reactor.

In one embodiment, the method may be performed by the interface system as recited herein, wherein the flow-switching valve may be in the first operational state, when the reactor-RPS rinsing liquid may be guided through the reactor and through the reaction-product-separator.

In another embodiment, the method may be performed by the interface system as recited herein, wherein the flow-switching valve may be in the first operational state during steps (a) and (b).

In other words, the present invention may provide an interface system comprising tubings with switchable connections between the chromatography unit, the mixing unit, the reactor, the reaction-product separator and the waste collector, which may allow rising the interface system, and each component following different rinsing procedures, with one or more solvents, i.e. the approach of the present invention may also allow separately rising each component of the interface system.

Additionally or alternately, the rinsing may be performed forward and/or backwards compared to a "normal" operation flow direction. Moreover, the rinsing may be performed with a mobile phase used for the liquid comprising the analytes, but also with other solvents, which may further contribute to dissolve any clogging particles.

Switching between different flow paths may be performed with the switching valves, however, it should be understood that implementations by other means may be possible.

The present invention may also be used to operate the interface system in a "stand-by-state", which may be implemented, for example, as a protection measure against contamination when no analytical runs are being performed in the interface system. Thus, all components of the interface system can be kept wetted and the temperature of the interface system may be maintained, which may contribute to increase the lifetime of the components of the interface system and may further reduce the time for restarting the interface system, e.g, between analytical runs, and/or rinsing steps.

In a third aspect, the present invention relates to an analytical system comprising the interface system as recited herein and a chromatography unit upstream of the interface system.

In one embodiment, the chromatography unit may be a liquid chromatography unit.

In one embodiment, the liquid chromatography unit may be an ion chromatography unit.

In one embodiment, the liquid chromatography unit may be a high-performance liquid chromatography unit.

In one embodiment, the analytical system may be configured to be pressurize to a pressure exceeding the ambient pressure by at least 0.5 bar, preferably by at least 500 bar, further preferably by at least 1,000 bar.

In one embodiment, the analytical system may comprise a mass spectrometer configured and located to detect the reaction product.

In a fourth aspect, the present invention relates to a protection system, the system comprising a chromatography assembly, a detector unit, wherein the detector unit is located downstream of the chromatography assembly, and a filter unit, wherein the filter unit is located downstream of the chromatography assembly and upstream of the detector unit. For example, the detector unit may be an isotope-ratio mass spectrometry (IRMS) unit and in particular a gas IRMS unit.

In simple words, the protection system may provide a method for reducing the occurrence of phenomena that may lead to failure of the interface system, e.g. the protection system may allow reducing the effect of clogging arising from ion bleeding from an analytic column. Therefore, the present invention may address such an issue, for example, via trapping out interfering ions before entering downstream components of the interface system, i.e. the protection system may allow to eliminate or at least reduce interfering ions present in a liquid intended to enter downstream components of the interface system.

In one embodiment the chromatography assembly may comprise a separation column.

However, it should be understood that in some embodiments, the chromatography assembly may just be used as an injection unit comprising an autosampler. In such a configuration, no separation column may be upstream of the filter unit. However, in most cases, contaminants may originate from a chromatographic separation via the separation column (e.g., an ion-exchange column), which may introduce specific substances into the mobile phase that may lead to the formation of insoluble products. However, the mobile phase and/or the analyte itself, which may be injected by the HPLC unit, may also contain substances that may cause clogging inside the interface system.

In one embodiment, the filter unit may comprise a guard column.

The guard column may be configured for capturing interfering ions, resulting from ion-bleeding of the separation column, from a liquid.

In another embodiment, the filter unit may comprise a suppressor unit.

In one embodiment, the filter unit may comprise a filtering element configured for filtering clogging particles present in a liquid.

The filtering element may be formed of one of: polymeric materials such as a poly-ether-ether-ketone (PEEK), a poly-ether-ketone (PEK), a poly-ketone (PK), a poly-ether-ketone-ether-ether-ketone (PEKEEK), or a polyphenylene sulfide (PPS), a metal such as stainless-steel, or titanium; and a sintered material.

In one embodiment, the filter unit may comprise a supply unit for supplying the filter unit with one or more of reagents, and solvents.

The filter unit may comprise a precipitate collector.

Furthermore, the protection system may comprise an in-line analytical unit.

In one embodiment, the in-line analytical unit may comprise one of: an ion-selective electrode, a pH meter, an electrical conductivity meter, and a thermal conductivity meter.

The guard column may comprise an ion-exchange column.

In one embodiment, the ion-exchange column may comprise a cation exchange column.

In another embodiment, the ion-exchange column may comprise an anion exchange column.

The approach of the protection system of the present invention may be particularly beneficial, as it may allow to implement a protection for any type of interface systems independently of the (pre)treatment that a liquid may receive within the interface system.

In a fifth aspect, the present invention relates to a protection method for protecting at least one component of an analytical system, wherein the method comprises utilizing the protection system as recited herein, wherein the method comprises (i) identifying a composition of a liquid, (ii) selecting species to be removed from the liquid and (iii) removing the species from the liquid.

The step (iii) may comprise removing from the liquid at least one of: ions, salts, and other harmful contaminants such as particles.

The step (iii) may comprise removing contaminants from the liquid via precipitation of contaminants through addition of at least one of: solvents, precipitating reagents.

The solvents may comprise one or more solvents that causes the contaminants to precipitate.

The precipitating reagents may comprise one or more reagents for changing a pH of the liquid, wherein changing the pH causes the contaminants to precipitate.

The precipitating reagents may comprise one or more reagents for changing an ionic strength of the liquid, wherein changing the strength causes the contaminants to precipitate.

The protection method may further comprise collecting precipitated contaminants in a precipitate collector.

The step (iii) may comprise removing contaminants from the liquid via filtering the liquid with the filtering unit.

The step (iii) may comprise removing contaminant via a guard column configured for capturing interfering ions, resulting from ion-bleeding of the separation column, from a liquid.

In other words, the protection method described above may allow to, for example, prevent or reduce critical clogging of the interface system that may occur while analyzing a plurality of samples, e.g. honey. Clogging while running such an analytical run may be identified and tracked down to contamination of an eluate through, for example, bleeding or flushing out from a chromatographic column of the chromatography unit, which may, inter alia, comprise ions, cations, or other substances. A reaction of these contaminants with employed reagents may normally lead to the formation of insoluble substances that may consequently clog the interface system. Therefore, the present invention may allow the removal of contaminants from the liquid before it may enter downstream components of the interface system, which may further contribute to avoid that the analyte separation, composition and isotope ratio may be altered.

The present invention may thus allow implementing a device capable of capturing contaminants and may further be adapted for different analytical runs. In some embodiments, a guard column may be used for efficiently capturing ions such as $Ca^{2+}$ ions from the liquid, and/or for preventing the formation of insoluble substances, such as calcium sulfate and calcium phosphate.

Embodiments of the present invention, therefore, relate to a robust and easy-to-implement method that may increase the lifetime of the interface system and which may reduce the amount of needed spare parts. It may furthermore contribute to the performance of the interface system in a routine analysis due to reduced downtimes for maintenance.

In one embodiment, the method may comprise utilizing the analytical system as recited herein and/or the protection system as recited herein.

In simple words, the present invention may provide a system and a process that may enable rinsing liquid-bearing components of the interface system via a defined and simple method, which may further allow easily resuming a routine analysis of samples after rinsing the component(s) of the interface system.

In general, the liquid flow from the chromatography unit, or other units, may be used as a rinsing stream for, for example, a reverse flushing of components of the interface system. The present invention may comprise the introduction of a cleaning procedure, i.e. a rinsing step, in which the components of the interface system may be rinsed individually, one component after another or all components together.

The present invention may also provide an easy-to-implement method that may allow preventing clogging of the interface system, which may consequently increase the interfaces system's robustness and its daily operating hours capabilities.

In other words, the approach of the present invention may provide means to ensure a steady runtime, e.g. 24 hours/7 days a week runtime, of, for instance, isotopic analytical systems for routine analysis of samples, e.g. samples of natural original, such as honey.

Moreover, embodiments of the present invention relate to an (automatic) method and system that can be used for cleaning of critical liquid-bearing parts as well as for protection of the interface system. In simple terms, embodiments of the present invention relate to a connection scheme of components that may enable a implementing a rinsing step as well as an (automatic) control and a monitoring principle for activation of the rinsing step.

Generally, it will be understood that clogging of components of the interface system, e.g. capillaries, may lead to failure of the interface system. The need of maintenance may be time consuming and sometimes complicated, and may further require operative manpower. Additionally, clogging of the components of the interface system may result in a more frequent change of spare parts. If the occurrence of blocking/clogging may be detected early on, the interface system can be cleaned via, for example, a reverse-flushing with a cleaning solvent, which may allow to reduce or eliminate the above-mentioned problems. Thus, embodiments of the present invention may provide a system that may enable rinsing of the interface system, e.g. via an (automatic) reverse flushing of its components.

In other words, the present invention may provide an interface system that may assume a plurality of operational configurations, which may cover diverse applications, inter alia, cleaning of components of the interface system, a "stand-by state" which may be advantageous, for example, for keeping components of the interface system wetted and for protection of the interface system. The stand-by state may in some instances also be advantageous, as it may allow an increased lifetime of components of the interface system as well as an increased "health" of the interface system, which may result, for instance, in faster restart between measurements.

Furthermore, embodiments of the present invention may allow implementing a black flush rinsing routine for cleaning critical components of the interface system, for example, either the reactor or the reaction-product separator, or any combination thereof. Moreover, the approach of the present invention may allow rinsing the interface system with one or more solvents, which may be different than the solvents used as mobile phase in the chromatography unit. This approach may be particularly advantageous, as it may allow using solvents or a combination of solvents that may dissolve contaminants, which may subsequently be transferred to a waste collector.

Additionally or alternately, embodiments may provide means to implement an automatic control of the interface system, which may allow implementing automatic rinsing procedures comprising, for example, automatic initiation of the rinsing step, which may further be facilitated via sensors comprised by the monitoring unit of the interface system.

Embodiments of the present invention may comprise using the interface system for a routine analysis of various substances as well as providing means for tackling the need of maintenance of the interface system. Furthermore, embodiments of the present invention may enhance the lifetime of the components of the interface system, which may also contribute to an improvement of the robustness of interface system.

In other words, the approach described by embodiments of the present invention may allow implementing a routine-based rinsing (or cleansing) of the most critical components of the interface system, e.g., for LC-to-IRSM analyte conversion. For instance, by using the chromatography unit coupled to the interface system, component(s) of the interface system may be rinsed via (back)flushing its components via an automatically controlled rinsing step. Thus, regular use of this method may extend the lifetime of the interface system with a reduced maintenance requirement. Furthermore, embodiments of the present invention may allow using the interface system in a "stand-by" state, which may further facilitate protecting the interface system.

The present technology is also defined by the following numbered embodiments.

Below, method embodiments will be discussed. These embodiments are abbreviated by the letter "M" followed by a number. When reference is herein made to a method embodiment, those embodiments are meant.

M1. A method performed in an interface system (100), the interface system (100) comprising a reactor (102) and a reaction-product-separator (104), the method comprising (a) guiding a liquid containing analytes to and through the reactor (102) and causing a component comprised by the analytes to react to a reaction product in the reactor (102), to thus create a post-reactor liquid comprising the reaction product, (b) guiding the post-reactor liquid from the reactor (102) to the reaction-product-separator (104) and through the reaction-product-separator (104), and separating the reaction product from the post-reactor liquid, to thus create a post-separator fluid, and (c) guiding at least one rinsing liquid through at least one of the reactor (102) and the reaction-product-separator (104).

M2. The method according to the preceding embodiment, wherein the at least one rinsing liquid comprises a reactor rinsing liquid, and step (c) comprises guiding the reactor rinsing liquid through the reactor (102).

M3. The method according to the preceding embodiment, wherein the reactor rinsing liquid enters the reactor (102) with a pressure of at least 1 bar, preferably at least 50 bar, such as 100 bar.

M4. The method according to any of the two preceding embodiments, wherein the reactor rinsing liquid is guided through the reactor (102) with a flow rate of at least 0.1 mL/min, preferably at least 1 mL/min, such as 2 mL/min.

M5. The method according to any of the preceding embodiments, wherein the at least one rinsing liquid comprises a reaction-product separator (RPS) rinsing liquid, and step (c) comprises guiding the RPS rinsing liquid through the reaction-product-separator (104).

M6. The method according to the preceding embodiment, wherein the RPS rinsing liquid enters the reaction-product-separator (104) with a pressure not exceeding 10 bar, preferably not exceeding 6 bar, such as 1 bar.

M7. The method according to any of the 2 preceding embodiments, wherein the RPS rinsing liquid is guided through the reaction-product-separator (104) with a flow rate lower than 3 mL/min, preferably lower than 1.0 mL/min, but higher than 0.1 mL/min, preferably higher than 0.3 mL/min.

M8. The method according to any of the preceding embodiments, wherein the at least one rinsing liquid comprises a reactor-RPS rinsing liquid, and step (c) comprises guiding the reactor-RPS rinsing liquid through the reactor (102) and through the reaction-product-separator (104).

M9. The method according to the preceding embodiment, wherein the reactor-RPS rinsing liquid is guided through the reactor (102) and the reaction-product-separator (104) with a pressure not exceeding 10 bar, preferably not exceeding 6 bar, such as 1 bar.

M10. The method according to any of the 2 preceding embodiment, wherein the reactor-RPS rinsing liquid is guided through the reactor (102) and the reaction-product-separator (104) with a flow rate lower than 3 mL/min, preferably lower than 1.0 mL/min, but higher than 0.1 mL/min, preferably higher than 0.3 mL/min.

M11. The method according to any of the preceding embodiments, wherein in step (a), the liquid containing analytes is guided through the reactor in a reactor direction, in step (b), the post reactor liquid is guided through the reaction-product-separator in a separator direction, and in step (c), at least a portion of the at least one rinsing liquid is guided through at least one of the reactor (102) and the reaction-product-separator (104) in a rinsing direction.

M12. The method according to the preceding embodiment, wherein the rinsing direction is identical to the reactor direction and/or the separator direction.

M13. The method according to the penultimate embodiment, wherein the rinsing direction is opposite to the reactor direction and/or the separator direction.

M14. The method according to any of the preceding embodiments, wherein the method comprises triggering step (c).

M15. The method according to the preceding embodiment, wherein the triggering of step (c) comprises manually triggering step (c).

M16. The method according to any of the 2 preceding embodiments, wherein the triggering of step (c) comprises automatically triggering step (c).

M17. The method according to the preceding embodiment, wherein automatically triggering comprises triggering step (c) at a time t after an analytical run.

M18. The method according to any of the preceding embodiments, wherein the method comprises using a mobile phase for guiding the liquids in steps (a), (b) and (c), wherein the mobile phase comprises one or more solvents.

M19. The method according to the preceding embodiment, wherein the mobile phase in step (c) is the same as in the steps (a) or (b).

M20. The method according to embodiment M18, wherein the mobile phase in step (c) is different than in steps (a) or (b).

M21. The method according to embodiment M18 and with the features of embodiments M2 and M5, wherein the mobile phase for guiding the reactor rinsing liquid is the same as the mobile phase for guiding the RPS rinsing liquid.

M22. The method according to embodiment M18 and with the features of embodiments M2 and M5, wherein the mobile phase for guiding the reactor rinsing is different than the mobile phase for guiding the RPS rinsing.

M23. The method according to any of the preceding embodiments and with the features of embodiments M2, M8 and M18, wherein the mobile phase for guiding the reactor rinsing liquid is the same as the mobile phase for guiding the reactor-RPS rinsing liquid.

M24. The method according to any of the preceding embodiments except the preceding embodiment and with the features of embodiments M2, M8 and M18, wherein the mobile phase for guiding the reactor rinsing liquid is different than the mobile phase for guiding the reactor-RPS rinsing.

M25. The method according to any of the preceding embodiments and with the features of embodiments M5, M8 and M18, wherein the mobile phase for guiding the RPS rinsing liquid is the same as the mobile phase for guiding the reactor-RPS rinsing liquid.

M26. The method according to any of the preceding embodiments expect the preceding embodiment and with the features of embodiments M5, M8 and M18, wherein the mobile phase for guiding the RPS rinsing liquid is different than the mobile phase for guiding the reactor-RPS rinsing.

M27. The method according to any of the preceding embodiments, wherein the method comprises detecting a need for cleaning.

M28. The method according to the preceding embodiment, wherein the step of detecting the need for cleaning comprises monitoring at least one of a pressure of a liquid in the interface system (100), a flow rate of a liquid in the interface system (100), a droplet rate at an outlet of the interface system (100), a particle load of a liquid in the interface system (100), a chemical composition of a liquid in the interface system (100), and at least one physical parameter of a liquid in the interface system (100).

M29. The method according to the preceding embodiment, wherein the pressure of a liquid is monitored via a pressure meter unit.

M30. The method according to the preceding embodiment, wherein the pressure meter unit comprises a pressure transducer.

M31. The method according to any of the 3 preceding embodiments, wherein the flow rate of the liquid is monitored via a flow meter unit.

M32. The method according to any of the 4 preceding embodiments, wherein the drop at the outlet is monitored via a drop detection sensor unit.

M33. The method according to any of the 5 preceding embodiments, wherein the particle load of the liquid is monitored via a light scattering (LS) technique.

M34. The method according to the preceding embodiment, wherein the light scattering technique is dynamic light scattering (DLS).

M35. The method according to any of the 7 preceding embodiments, wherein the particle load of the liquid is monitored via an absorption technique.

M36. The method according to the preceding embodiment, wherein the absorption technique is light obscuration.

M37. The method according to any of the 9 preceding embodiments, wherein the chemical composition of the liquid is monitored using at least one of ion selective electrodes, UV-Vis (ultraviolet-visible) absorption spectroscopy, and IR (infrared) absorption spectroscopy M38. The method according to any of the 10 preceding embodiments, wherein the physical parameters comprises at least one of thermal conductivity, and electrical conductivity.

M39. The method according to any of the preceding embodiments with the features of embodiments M16 and M27, wherein automatically triggering comprises triggering the step (c) when detecting the need for cleaning.

M40. The method according to any of the preceding embodiments with the features of embodiments M15 and M27, wherein manually triggering comprises prompting an input of a user for triggering the step (c) when detecting the need for cleaning.

M41. The method according to any of the preceding embodiments and with the features of embodiment M27, wherein the method comprises detecting a blocked flow at one or more components of the interface system (100).

M42. The method according to any of the preceding embodiments, wherein the method comprises detecting the reaction product separated in step (b).

M43. The method according to any of the preceding embodiments, wherein the method is for rinsing at least one component of the interface system (100).

M44. The method according to any of the preceding embodiments, wherein the method is for wetting at least one component of the interface system (100).

M45. The method according to any of the preceding embodiments and with the features of embodiment M17, wherein the method comprises executing the steps (a) and (b) in the interface system (100) as steps of the analytical run.

Below, system embodiments will be discussed. These embodiments are abbreviated by the letter "S" followed by a number. When reference is herein made to a system embodiment, those embodiments are meant.

S1. An interface system (100), wherein the system is configured to perform the method according to any of the preceding method embodiments, wherein the interface system (100) comprises the reactor (102) and the reaction-product-separator (104).

S2. The interface system (100) according to the preceding embodiment, wherein the interface system (100) comprises a mixing unit (106) configured to receive and mix at least two incoming liquids, and to provide a mixed liquid, wherein the interface system (100) is further configured to supply the mixed liquid as the liquid containing analytes to the reactor (102).

S3. The interface system (100) according to any of the 2 preceding embodiments, wherein the interface system (100) comprises an inlet filter unit (108).

S4. The interface system (100) according to the preceding embodiment, wherein the inlet filter unit (108) comprises a guard column.

S5. The interface system (100) according to any of the 2 preceding embodiments, wherein the inlet filter unit (108) comprises a suppressor unit.

S6. The interface system (100) according to any of the 3 preceding embodiments, wherein the inlet filter unit (108) comprises a filtering element.

S7. The interface system (100) according to any of the preceding system embodiments, wherein the interface system (100) comprises a reactor filter unit (110).

S8. The interface system (100) according to the preceding embodiment and with the features of embodiment S2, wherein the reactor filter unit (110) is located between the mixing unit (106) and the reactor (102).

S9. The interface system (100) according to the preceding, wherein the reactor filter unit (110) comprises a filtering element.

S10. The interface system (100) according to any of the 2 preceding embodiments, wherein the reactor filter unit (110) comprises a guard column.

S11. The interface system (100) according to any of the preceding system embodiments, wherein the interface system (100) comprises a first switching valve (112) configured to assume at least two operational states.

S12. The interface system (100) according to the preceding embodiment, wherein the interface system (100) comprises a second switching valve (114) configured to assume at least two operational states.

S13. The interface system (100) according to any of the preceding system embodiments, wherein the interface system (100) comprises a closing valve (116) configured to assume an open and a closed state.

S14. The interface system (100) according to any of the preceding system embodiments, wherein the interface system (100) comprises a flow-switching valve (118) configured to assume a first operational state (P) and a second operational state (C).

S15. The interface system (100) according to the preceding embodiment, wherein the flow-switching valve (118) comprises a first connector, a second connector, a third connector, and a fourth connector, and wherein in the first operational state (P) of the flow-switching valve (118), the first connector is connected to the third connector and the second connector is connected to the fourth connector, and in the second operational state (C) of the flow-switching valve (118), the first connector is connected to the fourth connector and the second connector is connected to the third connector.

S16. The interface system (100) according to any of the preceding system embodiments, wherein the interface system (100) comprises a waste collector (120).

S17. The interface system (100) according to any of the preceding system embodiments, wherein the interface system (100) comprises a monitoring unit (122) arranged downstream the closing valve (116) and upstream the waste collector (120).

S18. The interface system (100) according to any of the preceding system embodiments, wherein the interface system (100) comprises an inlet coupling for coupling the system with a chromatography unit (200).

S19. The interface system (100) according to any of the preceding system embodiments with the features of embodiments S2, S11, S12, S13, and S16, wherein the interface system (100) comprises a plurality of coupling tubings including a first tubing (10) arranged between the first switching valve (112) and the second switching valve (114);

a second tubing (12) arranged between the first switching valve (112) and the closing valve (116);

a third tubing (14) arranged between the first switching valve (112) and the mixing unit (106);

a fourth tubing (16) arranged between the mixing unit (106) and the reactor (102);

a fifth tubing (18) arranged between the reactor (102) and the second switching valve (114);

a sixth tubing (20) arranged between the second switching valve (114) and the waste collector (120);

a seventh tubing (22) arranged between the second switching valve (114) and the reaction-product separator (104); and an eighth tubing (24) arranged between the reaction-product separator (104) and the closing valve (116).

S20. The interface system (100) according to the preceding embodiment, wherein the first switching valve (112) is configured to assume a first operational state (A), wherein the mixing unit (106) is fluidly connected to the chromatography unit (200), and the first tubing (10) and the second tubing (12) are connected to dead-ends (80), respectively; and a second operational state (B), wherein the chromatography unit (200) is fluidly connected to the first tubing (10), and the mixing unit (106) is fluidly connected to the second tubing (12).

S21. The interface system (100) according to any of the 2 preceding embodiments and with the features of embodiment S12, wherein the second switching valve (114) is configured to assume a first operational state (A), wherein the reactor (102) is fluidly connected to the reaction-product separator (104); and a second operational state (B), wherein the reactor (102) is fluidly connected to the first tubing (10).

S22. The interface system (100) according to the any of the preceding system embodiments and with the features of embodiment S17, wherein the monitoring unit (122) comprises at least one of a pressure meter, a flowmeter, an ion-selective electrode, a UV-Vis absorption spectrometer, an IR absorption spectrometer, a LS spectrometer, an electrical conductivity meter, and a thermal conductivity meter.

S23. The interface system (100) according to any of the preceding system embodiments, wherein the reactor (102) comprises an inner flow length in the range of 1 to 10 m, preferably 2 to 8 m, such as 4 m.

S24. The interface system (100) according to any of the preceding system embodiments, wherein the reactor (102) comprises an inner flow diameter in the range of 100 to 1,200 µm, preferably between 150 to 500 µm, such as 250 µm; or in the range of 500 to 800 µm, such as 635 µm.

S25. The interface system (100) according to any of two preceding system embodiments, wherein the reaction-product separator (104) comprises a separator membrane.

S26. The interface system (100) according to the preceding embodiment, wherein the separator membrane comprises a polymer-electrolyte membrane.

S27. The interface system (100) according to any of the 2 preceding embodiments, wherein the separator membrane comprises membrane tubes.

S28. The interface system (100) according to any of the 3 preceding embodiments, wherein the separator membrane is a $CO_2$-separation membrane.

S29. The interface system (100) according to any of the preceding system embodiments, wherein the reactor (102) is an oxidation reactor.

S30. The interface system (100) according to any of the preceding system embodiments, wherein the reaction-product-separator (104) is configured to separate carbon dioxide from the post-reactor liquid.

M46. The method according to any of the preceding method embodiments, wherein the method is performed by the interface system (100) according to any of the preceding system embodiments, wherein in steps (a) and (b), the interface system (100) assumes a first configuration, wherein the reactor (102) and the reaction-product-separator (104) are fluidly connected, and in step (c), the system assumes at least a second configuration, which is different from the first configuration.

M47. The method according to the preceding embodiment and with the features of embodiment M2, wherein in step (c) the at least second configuration comprises the system assuming a reactor-rinsing configuration, wherein in the reactor-rising configuration, the reactor rinsing liquid is not guided through the reaction-product-separator (104).

M48. The method according to any of the 2 preceding embodiments and with the features of embodiment M5, wherein in step (c) the at least second configuration comprises the system assuming a RPS-rinsing configuration, wherein in the RPS-rising configuration, the RPS rinsing liquid is not guided through the reactor (102).

M49. The method according to any of the preceding method embodiments, wherein a pressure of a liquid in the interface system (100) is monitored via the chromatography unit (200).

M50. The method according to any of the preceding method embodiments with the features of embodiment M5, wherein the method is performed by the interface system (100) according to any of the preceding system embodiments with the features of embodiment S13, wherein the flow-switching valve (118) is in the second operational state, when the RPS rinsing liquid is guided through the reaction-product-separator (104).

M51. The method according to any of the preceding method embodiments with the features of embodiment M2, wherein the method is performed by the interface system (100) according to any of the preceding system embodiments with the features of embodiment S13, wherein the flow-switching valve (118) is in the first operational state, when the reactor rinsing liquid is guided through the reactor (102).

M52. The method according to any of the preceding method embodiments with the features of embodiment M8, wherein the method is performed by the interface system (100) according to any of the preceding system embodiments with the features of embodiment S13, wherein the flow-switching valve (118) is in the first operational state, when the reactor-RPS rinsing liquid is guided through the reactor and through the reaction-product-separator (104).

M53. The method according to any of the preceding method embodiments, wherein the method is performed by the interface system (100) according to any of the preceding system embodiments with the features of embodiment S13, wherein the flow-switching valve (118) is in the first operational state during steps (a) and (b).

Below, analytical system embodiments will be discussed. These embodiments are abbreviated by the letter "A" followed by a number. When reference is herein made to an analytical system embodiment, those embodiments are meant.

A1. An analytical system comprising the interface system (100) according to any of the preceding interface system embodiments and a chromatography unit (200) upstream of the interface system (100).

A2. The analytical system according to the preceding embodiment, wherein the chromatography unit (200) is a liquid chromatography unit.

A3. The analytical system according to any of the two preceding embodiments, wherein the liquid chromatography unit is an ion chromatography unit.

A4. The analytical system according to any of the 3 preceding embodiments, wherein the liquid chromatography unit is a high-performance liquid chromatography unit.

A5. The analytical system according to any of the 4 preceding embodiments, wherein the analytical system is configured to be pressurize to a pressure exceeding the ambient pressure by at least 0.5 bar, preferably by at least 500 bar, further preferably by at least 1,000 bar.

A6. The analytical system according to any of the preceding 5 embodiments, wherein the analytical system comprises a mass spectrometer (300) configured and located to detect the reaction product.

Below, protection system embodiments will be discussed. These embodiments are abbreviated by the letter "P" followed by a number. When reference is herein made to a protection system embodiment, those embodiments are meant.

P1. A protection system, the system comprising a chromatography assembly, a detector unit (300), wherein the detector unit is located downstream of the chromatography assembly, and a filter unit (108), wherein the filter unit is located downstream of the chromatography assembly and upstream of the detector unit (300).

P2. The protection system according to the preceding embodiment, wherein the chromatography assembly comprises a separation column.

P3. The protection system according to any of the 2 preceding embodiments, wherein the filter unit (108) comprises a guard column.

The guard column may be configured for capturing interfering ions, resulting from ion-bleeding of the separation column, from a liquid.

P4. The protection system according to any of the 3 preceding embodiments, wherein the filter unit (108) comprises a suppressor unit.

P5. The protection system according to any of the 4 preceding embodiments, wherein the filter unit (108) comprises a filtering element configured for filtering clogging particles present in a liquid.

P6. The protection system according to the preceding embodiment, wherein the filtering element is formed of one of polymeric materials such as a poly-ether-ether-ketone (PEEK), a poly-ether-ketone (PEK), a poly-ketone (PK), a poly-ether-ketone-ether-ether-ketone (PE-KEEK), or a polyphenylene sulfide (PPS);

a metal such as stainless-steel, or titanium; and a sintered material.

P7. The protection system according to any of the preceding protection system embodiments, wherein the filter unit (108) comprises a supply unit for supplying the filter unit (108) with one or more of reagents, and solvents.

P8. The protection system according to any of the preceding protection system embodiments, wherein the filter unit (108) comprises a precipitate collector.

P9. The protection system according to any of the preceding protection system embodiments, wherein the protection system comprises an in-line analytical unit.

P10. The protection system according to the preceding embodiment, wherein the in-line analytical unit comprises one of an ion-selective electrode;

a pH meter;

an electrical conductivity meter; and a thermal conductivity meter.

P11. The protection system according to any of the preceding protection system embodiments and with the features of embodiment P3, wherein the guard column comprises an ion-exchange column.

P12. The protection system according to the preceding embodiment, wherein the ion-exchange column comprises a cation exchange column.

P13. The protection system according to any of the two preceding embodiments, wherein the ion-exchange column comprises an anion exchange column.

Below, protection method embodiments will be discussed. These embodiments are abbreviated by the letter "N" followed by a number. When reference is herein made to a protection method embodiment, those embodiments are meant.

N1. A protection method for protecting at least one component of an analytical system, wherein the method comprises utilizing the protection system according to any of the preceding protection system embodiments, wherein the method comprises (i) identifying a composition of a liquid;

(ii) selecting species to be removed from the liquid;

(iii) removing the species from the liquid.

N2. The protection method according to the preceding embodiment, wherein the step (iii) comprises removing from the liquid at least one of ions;

salts; and other harmful contaminants such as particles.

N3. The protection method according to any of the 2 preceding embodiments, wherein the step (iii) comprises removing contaminants from the liquid via precipitation of contaminants through addition of at least one of solvents;

precipitating reagents.

N4. The protection method according to the preceding embodiments, wherein the solvents comprise one or more solvents that causes the contaminants to precipitate.

N5. The protection method according to any of the 2 preceding embodiments, wherein the precipitating reagents comprise one or more reagents for changing a pH of the liquid, wherein changing the pH causes the contaminants to precipitate.

N6. The protection method according to any of the 3 preceding embodiments, wherein the precipitating reagents comprise one or more reagents for changing an ionic strength of the liquid, wherein changing the strength causes the contaminants to precipitate.

N7. The protection method according to any of the 4 preceding embodiments, wherein method further comprises collecting precipitated contaminants in a precipitate collector.

N8. The protection method according to any of any of the preceding protection method embodiments, wherein step (iii) comprises removing contaminants from the liquid via filtering the liquid with the filtering unit.

N9. The protection method according to any of the preceding protection method embodiments, wherein step (iii) comprises removing contaminant via a guard column configured for capturing interfering ions, resulting from ion-bleeding of the separation column (202), from a liquid.

M54. The method according to any of the preceding method embodiments, wherein the method comprises utilizing the analytical system according to any of the preceding analytical system embodiments and/or the protection system according to any of the preceding protection system embodiments.

The present invention will now be described with reference to the accompanying drawings which illustrate embodiments of the invention. These embodiments should only exemplify, but not limit, the present invention.

DETAILED DESCRIPTION OF THE FIGURES

It is noted that not all the drawings carry all the reference signs. Instead, in some of the drawings, some of the reference signs have been omitted for sake of brevity and simplicity of illustration. Embodiments of the present invention will now be described with reference to the accompanying drawings.

Figure 1:
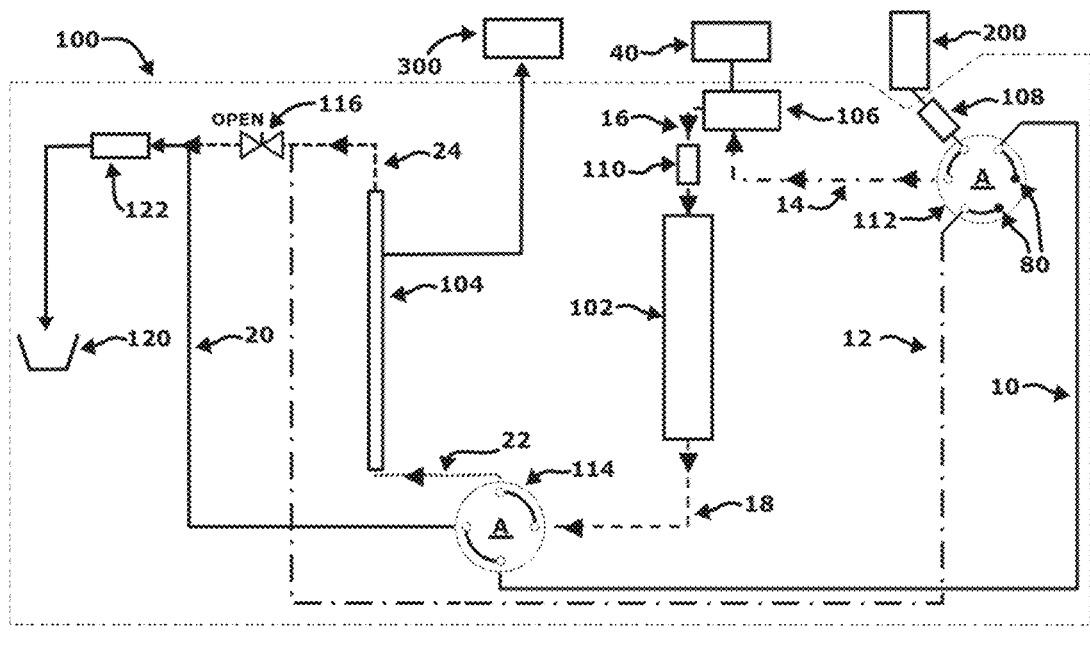
FIG. 1 depicts an analytical system with an interface system assuming a first state according to embodiments of the present invention.

FIG. 1 depicts an analytical system comprising an interface system 100. The analytical system further comprises a chromatography unit 200 and a detector unit 300, for example, a mass spectrometer. The interface system 100 connects, i.e., interfaces the chromatography unit 200 and the detector unit 300. That is, a fluid from the chromatography unit 200 may be guided into the interface system 100, and substances of interest may be guided from the interface system 100 to the detector unit 300 for subsequent detection. A basic operation principle is the reaction of the analyte within the liquid phase of the LC eluate to a reaction product, e.g., oxidation to $CO_2$. The $CO_2$ is then removed from the eluate in a separator (e.g., by using a Nafion gas-exchanger membrane) and transferred to a detector 300 (e.g., IRMS system, and more particularly a gas IRMS system). While in the depicted embodiment, the interface system 100 connects a chromatography unit 200 to detector unit 300, it should be understood that this is merely exemplary, and that it may also connect other elements to a detector unit. For example, the discussed interface system 100 may also be used in conjunction with a manual sample injection. In this case, there would be provided an entrance port to which the sample could be manually injected.

In FIG. 1, the interface system 100 assumes a first state. In simple terms, the interface system 100 may comprise a plurality of components, wherein the plurality of components of the interface system 100 may be configured to supply means of treatment or pre-treatment of a given sample or a plurality of samples comprising one or more substances, properties of which may be required to be analyzed. The depicted interface system 100 comprises a reactor 102 and a reaction-product separator 104. The reactor 102 may be a chemical reactor 102.

The reactor 102 may comprise a container, e.g. a vessel, a capillary (micro) reactor, etc., to carry out a controlled reaction, for instance, a chemical reaction, to transform a set of substances, which may also be referred to as sample, into one or more substances of interest, which may also be referred to target product. Such a reaction may typically aim to obtain one or more substances of interest with a simpler structure from an initial sample of more complex structure and/or composition, e.g. the reaction may comprise transforming a carbohydrate of natural origin such as fructose into a smaller carbon-containing molecule such as carbon dioxide. To do so, the interface system 100 may be coupled with a unit (e.g., chromatography unit 200) configured to supply a liquid comprising at least one substance required for the reaction, i.e. the sample, and a unit (e.g., unit 40) configured to supply additional substances required for the reaction, which may also be referred to as reagents.

In one embodiment, the reaction may take place by adjusting operational parameters of the reactor 102, e.g. via increasing temperature and pressure in the reactor 102.

In another embodiment, the reaction may take place when a given reagent is supplied, e.g. by an oxidizing reagent, which in combination with operational parameters of the reactor 102 may yield the target product.

In one embodiment, the reactor 102 may comprise a heated, long capillary with a narrow diameter with length in range of 1 to 10 m, preferably between 2 to 8 m, such as 4 m, and an inner diameter in a range of 100 to 1,200 μm, preferably between 150 to 500 μm, such as 250 μm. The inner diameter may also be in a range of 500 to 800 μm, such as 635 μm. In some instances, such a reactor 102 may be advantageous, as it may allow a quantitative reaction while maintaining a chromatographic separation between analytes species.

As discussed, the interface system 100 may be coupled to a chromatography unit 200, such as a liquid chromatography unit, e.g. a high-performance liquid chromatography (HPLC) unit, or an ion chromatography pump unit, which may supply the liquid, i.e. an eluate, to the interface system 100. The liquid chromatography unit 200 may also be referred to as a high-performance liquid chromatography unit 200 (or simply HPLC unit 200), an ion chromatography pump unit 200, and it should be understood that any of these terms may be used in the following description as interchangeable examples, not limiting the chromatography unit 200 only to these examples. The eluent supplied by the HPLC unit 200 may comprise analytes. Such analytes may comprise complex structures which may require further transformation in order to derive the liquid to a structure and/or composition more suitable to analyze a defined set of properties, e.g. transformation of the analyte in smaller molecules suitable for analysis of isotope-ratio of an analyte of natural origin such as honey.

It should be understood that the analyte may be contained in the sample (i.e. the sample may comprise for instance a mobile phase such as one or more solvents and a matrix containing the analyte), and that the sample may be supplied to the interface system 100 as an eluate of an HPLC unit 200.

It should also be understood that the sample may be supplied via other means, such as different analytical units capable of generating and/or preparing a sample to be analyzed. The sample may also be supplied to the interface system 100 without pre-treatments, for instance, via direct injection into the interface system 100. Therefore, independently of the means used to supply the sample to the interface system 100, the sample may also be referred to as liquid to be analyzed or simply as liquid.

The interface system 100 may guide the liquid to a mixing unit 106, wherein reagents may be supplied and mixed with the liquid comprising analytes. After a mixture is obtained, this may be guided to and through the reactor 102 causing a component comprised by the analytes to react with the reagents to obtain a liquid that may be referred to as post-reactor liquid and which may comprise a reaction product.

Furthermore, the interface system 100 may be configured to tune operational parameters of the reactor 102, which may set the required conditions for a reaction to take place. For instance, the internal temperature of the reactor 102 may be increased to force the reaction between reagents and analytes.

In one embodiment, the reaction in the reactor 102 may comprise an oxidation process and/or a reduction process of the mixture to derive into the target substance, e.g. the mixture may be oxidized into carbon dioxide ($CO_2$).

In another embodiment, the mixture of substances may be heated at high temperatures to produce other type of the gases, such as $H_2$, $N_2$ and CO.

The system 100 may then guide the post-reactor liquid to a reaction-product-separator 104, which may be configured to separate the reaction product from the post-reactor liquid, and thus also generate a post-separator fluid. The separated reaction product may then be guided to an analytical device 300, while the post-separator fluid may be guided to a waste collector 120. For example, the analytical device 300 may comprise an isotope-ratio mass spectrometer (IRMS).

It should be understood that the reaction product may also be referred to as a target substance, which may be different from one sample to another. For example, in a given sample, the reaction product may comprise a mixture of $CO_2$ comprising different isotope of carbon such as carbon-12 ($^{12}$C) and/or carbon-13 ($^{13}$C), however, in another sample, the reaction product may comprise a mixture of hydrogen comprising different isotopes such as hydrogen-1 ($^1$H) and/or hydrogen-2 ($^2$H), or a mixture of isotopes of hydrogen and carbon.

In one embodiment, the reaction-product separator 104 may comprise polymer-electrolyte membrane tubes to separate $CO_2$ from the liquid phase, and the $CO_2$ may subsequently be transferred to the analytical device 300. In some instances, using polymer-electrolyte membrane tubes may be advantageous, as it may allow to accurately and reproducibly separate carbon isotopes from a liquid for measuring the carbon isotope ratios in a sample.

After separating the reaction product from the post-reaction liquid, the remaining liquid (i.e., the post-separator liquid) may be guided to a waste collector 120. Properties of the remaining liquid may be monitored via a monitoring unit 122, which may comprise one or more units, such as flow drop detector, a pressure meter, an UV-Vis absorption detector, an IR absorption detector, etc. The monitoring unit 122 may also be used to monitor a performance status of the interface system 100 via measuring properties of a liquid being guided to the waste collector 120.

In one embodiment, a liquid may be guided from the HPLC unit 200 to the mixing unit 106 through a switching valve 112, which may also be referred to as first switching valve 112. The first switching valve 112 may comprise a 6-port switching valve, which may be configured to assume at least two operational states. The operation states may also be referred to as operational configurations or simply as states or configurations.

FIG. 1 depicts a first operational configuration of the first switching valve 112 conceptually identified by letter A in valve 112. When in the operational configuration A, the first switching valve 112 may establish a fluid connection between the HPLC unit 200 and the mixing unit 106 through a tubing 14. Furthermore, while in the configuration A, the first switching valve 112 may connect tubings 12 and 10 to plugs 80, respectively, so that no fluid connection is established, i.e. the plug 80 provides a dead-end connection and may therefore be referred to as dead-end(s) 80. Thus, while the first switching valve 112 is in the first operational configuration A, the liquid supplied by the HPLC unit 200 may be guided to the mixing unit 106, while no other operational fluid connection is established by the first switching valve 112 in this configuration.

In one embodiment, the liquid may be guided directly from HPLC unit 200 to the mixing unit 106 through the first valve 112. In another embodiment, a filter unit 108 may be arranged downstream of the HPLC unit 200, e.g., between the HPLC unit 200 and the first switching valve 112, i.e. the filter unit 108 may be arranged downstream of the HPLC unit 200 and upstream of the first switching valve 112.

It should be understood that when referring to the arrangement of a component of the interface system 100 between other components of the interface system 100, the term "between" is intended to indicate their positioning in the flow path, for instance, "the filter unit 108 arranged between the HPLC unit 200 and the first switching valve 112" is intended to refer to the positioning of the filter unit 108 in the flow path in the interface system 100, wherein the filter unit 108 is arranged downstream of the HPLC unit 200 and upstream of the first switching valve 112.

It should be understood in the following description that the terms "interfering substance" and "contaminant" may be used indistinctly and that these terms are intended to refer to substances different from the analyte that may cause or may result in occurrence of an unwanted phenomenon, e.g. clogging of the interface system 100.

The filter unit 108 may be configured to avoid contaminants, which may be present in the liquid supplied by the HPLC unit 200, to enter components further downstream. The contaminants present in the liquid supplied by the HPLC unit 200 may comprise particulate impurities, partially insoluble compounds, highly retainable compounds such as fatty acids, etc., that may clog the components of the interface system 100.

In one embodiment, the filter unit 108 may comprise a protective column or cartridge, e.g. a guard column, which may be configured to provide an adequate liquid filtration with a negligible pressure variation.

In one embodiment, the filter unit 108 may comprise a guard column with a length in the range of 0.5 to 25 cm, preferably between 1 and 6 cm, such as 5 cm, with an internal diameter in the range of 0.5 to 8 mm, preferably 2 to 78 mm, such as 5 mm. Furthermore, the filter unit 180 may be packed with peculiar particles with a diameter in range of 2 to 80 μm, preferably 3 to 30 μm, such as 5 μm.

In another embodiment, the filter unit 108 may comprise a filtering element comprising materials such as a frit with pores having diameters in range of 0.5 to 100 μm, preferably 1 to 10 μm, such as 2 μm.

In a still further embodiment, the filter unit 108 may comprise (or be realized as) a suppressor unit 108. It will be understood that a suppressor unit (which may also simply be referred to as a suppressor) functions in principle as does a guard column. However, the suppressor unit may further contain an exchange membrane allowing it to be regenerated continuously by a steady counterflow with a regeneration reagent at the outside of the active membrane, which may be advantageous.

After the liquid has been filtered (for instance, by the filter unit 108), the liquid may be guided to the mixing unit 106, wherein the liquid may be mixed with one or more reagents and the mixture may be guided to the reactor 102.

In one embodiment, the mixture exiting the mixing unit 108 may also be filtered again before entering the reactor 102. For instance, the interface system 100 may comprise a filter unit 110 arranged between the mixing unit 106 and the reactor 102, i.e. the filter unit 110 may be arranged downstream of the mixing unit 106 and upstream of the reactor 102 (where it is noted that "downstream" here refers to the usual flow direction when performing an analysis).

In one embodiment, the filter unit 110 may be similar to the filter unit 108.

In another embodiment, the filter unit 108 may be different from the filter unit 108. For example, the filter unit 110 may comprise a filtering element with a finer porosity or a guard column configured to retain a different species than the species retained by the filter unit 108.

The filter unit 110 may be advantageous, as it may allow preventing undesired substances, e.g. by-products, which may be formed during the mixing of the liquid with the reagents in the mixing unit 106, to enter the reactor 102.

In the reactor 102, the mixture may undergo one or a plurality of reactions, e.g. a reduction or an oxidation, which may differ according to the substance that may be intended to be quantified in the analytical device 300.

As discussed, the interface system 100 may also comprise a reaction-product separator 104 configured to separate the reaction product from the post-reactor liquid.

The interface system 100 may comprise an additional switching valve 114, which may also be referred to as second switching valve 114.

In one embodiment, the second switching valve 114 may comprise a 4-port switching valve, which may be configured to assume at least two operational configurations.

FIG. 1 depicts a first operational configuration of the second switching valve conceptually identified by letter A. When in the operational configuration A, the second switching valve 114 may establish a fluid connection between the reactor 102 and the reaction-product separator 104 through tubings 18 and 22.

In this configuration, the interface system 100 may guide the post-reactor liquid to the reaction-product separator 104. To do so, the interface system 100 may guide the post-reactor liquid through a second switching valve 114, while the switching valve 114 is in the first operational state A.

The reaction-product separator 104 may comprise a separation unit configured to selectively separate components of the post-reactor liquid. For instance, if the sample introduced to the interface system 100 is intended to be further subjected to IRMS analysis, the post-reactor liquid may likely comprise a liquid with dissolved gases, which, in this case, may be the target components for analysis of the isotope ratio distribution, e.g. the reaction-product liquid may comprise a liquid with dissolved $CO_2$, NOx, etc., and the isotope ratio distribution of each element may be of interest to determine, i.e. it may be of interest to quantify the isotope ratio of, for example, $^{13}C/^{12}C$ and $^{15}N/^{14}N$. Therefore, the reaction-product separator 104 may be adapted to separate gaseous streams, i.e. dissolved gases of interest, from liquid streams, i.e. the liquid phase.

In one embodiment, the reaction-product separator 104 may comprise a separation membrane that may selectively separate a given gas from the reaction-product liquid, e.g. a $CO_2$ membrane which allows the $CO_2$ to pass through to the analytical device 300 while retaining the remaining dissolved gases and the liquid phase (i.e., the post-separator liquid), which may subsequently be guided to a waste collector 120.

Furthermore, the interface system 100 may also comprise a closing valve 116, which may allow controlling the flow between the tubings 12 and 24, and the waste collector 120. The closing valve 116 may be arranged between the reaction-product separator 104 and the waste collector 120, i.e. the closing valve 116 may be arranged downstream of the reaction-product separator 104 and upstream of the waste collector 120 (upstream and downstream here referring to the flow direction during normal analytical operation). The closing valve 116 may allow to control, for example, whether a liquid flowing in the tubing 12 is guided directly towards the waste collector 120 or towards the reaction-product separator 104.

In other words, the interface system 100 may be supplied with an eluate, i.e. a solution of analyte in a solvent, via a liquid chromatography unit 200. The liquid chromatography unit 200 may be configured to separate possible analytes contained in a given matrix, e.g. the liquid chromatography unit 200 may be configured to separate sugars comprised by a sample of natural occurrence such as fructose from honey.

Subsequently, the interface system 100 may guide the eluate through the first switching valve 112 to a mixing unit 106. Here, the interface system 100 may mix the eluate with reagents and the mixture may be guided to the reactor 102, where, for example, an increased temperature, may force a quantitative reaction between reagents and analyte into a simpler molecule, e.g. $CO_2$. The interface system 100 may guide the liquid, which may now include dissolved $CO_2$ (i.e., the post-reactor liquid), through the second switching valve 114 to the reaction-product separator 104, where the $CO_2$ may be removed from the liquid through, e.g. a helium counterflow around a $CO_2$-permeable membrane, for analysis in the analytical device 300. The interface system 100 may guide the remaining liquid, i.e. the liquid from which the $CO_2$ has been removed (i.e., the post-separator liquid), through the closing valve 116 to the waste collector 120.

Reactions carried out in the reactor 102 may comprise by-products or result in occurrence of unwanted chemical reactions, which may produce clogging contaminants, e.g. particles or product of low solubility, which may eventually deposit inside the components of the interface system 100. Such clogging contaminants may clog not only the reactor 102 but also the reaction-product separator 104, which may lead to failure of the complete interface system 100. Embodiments of the present technology seek to overcome such clogging and failure.

Further, it should be understood that FIG. 1 depicts the normal analytical operation of the interface system 100 in a first state, and that the arrows in this Figure (and also in the other Figures) denote a direction of flow. In FIG. 1, a sample may be separated in the chromatography unit 200. The temporally separated sample may then be guided through the filter unit 108, which may prevent some particles from entering the downstream components. The liquid containing the sample may then be guided via first switching valve 112 (which is in state A) to the mixing unit 106, where the liquid may be mixed with reagents. The mixed liquid may then be guided (via an optional filter unit 110) into the reactor 102, where a reaction may occur to create a reaction product. For example, carbon contained in the sample may be oxidized to carbon dioxide. Thus, a post-reactor liquid containing the reaction product may be generated, and this post-reactor liquid may be guided via the second switching valve 114 (assuming a state A) to a reaction-product-separator 104, where the reaction product (e.g., the carbon dioxide) may be separated from the remaining liquid. The reaction product (e.g., carbon dioxide) may then be supplied to a detector 300, e.g., a mass spectrometer, and the remaining liquid (i.e., the post-separator liquid) may be guided to a waste receptacle 120. It will be understood that thus, components of the sample may be analyzed.

Figure 2:
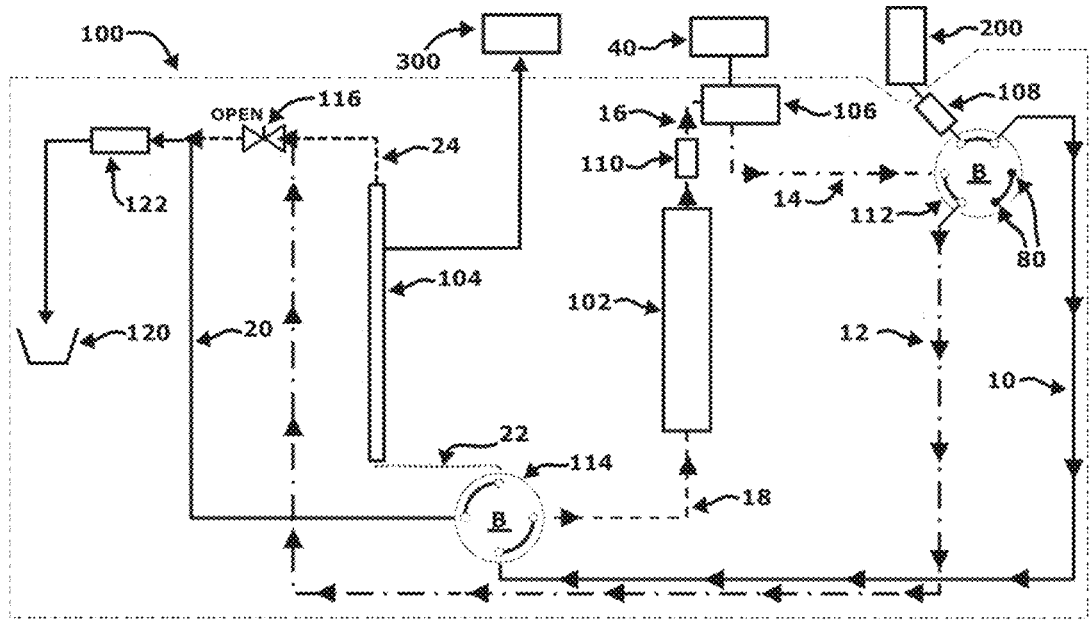
FIG. 2 depicts the interface system assuming a second state according to embodiments of the present invention.

FIG. 2 depicts the interface system 100 assuming a second state according to embodiments of the present invention. In simple terms, the second state may comprise the first switching valve 112 and the second switching valve 114 assuming second operational configurations conceptually identified by letters B.

As discussed, in FIG. 1, the interface system 100 may guide a liquid containing analytes through the reactor 102 in a reactor direction and the post-reactor liquid through the reaction-product separator 104 in a separator direction.

It should be understood that the terms "reactor direction" and "separator direction" are intended to relate to a flow direction during an analytical procedure. In other words, the "reactor direction" is the normal flow direction during an analysis through the reactor, and the "separator direction" is the normal flow direction during analysis through the separator. This normal flow direction may also be referred to as analytical flow direction, forward flow direction. In other words, these terms are intended to refer to the "normal" flow direction during an analytical run.

While in the switching valves 112 and 114 are in the operational configuration B, the interface system 100 may establish a fluid connection between the HPLC unit 200 and the reactor 102. However, this fluid connection is different to the fluid connection depicted in FIG. 1. In particular, it will be understood that the flow direction of liquid through the reactor 102 in FIG. 2 is opposite to the flow direction in FIG. 1. Therefore, the flow direction in FIG. 2 may be referred to as reverse flow, back flow, backflush or reverse flush (all with respect to the "normal" flow direction during an analytical run). Moreover, the step of the interface system 100 guiding a liquid in a reverse flow may also be referred to as backflushing or reverse flushing.

Moreover, while in the operational state B, the first switching valve 112 may establish a fluid connection between the HPLC unit 200 and the second switching valve 114. While the second switching valve 114 is in the operational state B, the second switching 114 valve may establish a fluid connection between the first switching valve 112 and the reactor 102.

When the closing valve 116 is in the open state (as in FIG. 2), the liquid may only be guided in a reverse flow through the reactor 102 and the mixing unit 106 and afterwards, to the waste collector 120, without passing through the reaction-product separator 104. In this regard, it will be understood that in the configuration depicted in FIG. 2, for a liquid portion arriving at the intersection of tubings 12 and 24, there are two possible flow directions: one via valve 116 and towards the waste collector 120, and one via separator 104, and switching valve 114 towards the waste collector 120. It will be understood that the flow resistance will typically be a much lower in the "direct path" than in the path comprising the separator 104. Thus, when the closing valve 116 is open (see FIG. 2), liquid will flow in the direct path, and thus bypass the separator 104 in this configuration. Thus, while in the configuration depicted in FIG. 2, there is a fluid connection between tubing 12 and separator 104 (via tubing 116), the liquid will travel straight to waste 120 after leaving tubing 12.

Thus, the configuration in FIG. 2 may be used to rinse or wash the reactor 102 while bypassing the separator 104, which may be advantageous.

In other words, the interface system 100 may guide a rinsing liquid through the reactor 102 in order to rinse out ("eliminate") any substances that may cause an inadequate performance of the reactor 102, e.g. the interface system 100 may guide a rinsing liquid through the reactor 102 to eliminate clogging particles, contaminants attached to the inner wall of the reactor 102, etc. Therefore, the step of guiding a rinsing liquid through the reactor 104 may be referred to as reactor-rinsing step and the configuration assumed by the interface system 100 to execute the reactor-rinsing step may be referred to as reactor-rinsing configuration or reactor-rinsing state.

In some embodiments, the rinsing may be a "backflush" rinsing, i.e., the components that are rinsed are rinsed with a flow opposite to the normal analytical flow.

The rising liquid used for the reactor-rinsing step may comprise the same solvents used to guide, for example, an eluate of the HPLC unit 200 (as depicted in FIG. 2), or different solvents than the ones used to guide the eluate. For instance, the rinsing liquid may comprise one or more solvents with chemical properties that may permit dissolving clogging contaminants, and it should be understood that the rinsing liquid may also comprise a solution of an active ingredient that may facilitate eliminating contaminants, e.g. a surfactant, a chelating agent or a solution with a specific pH for dissolving deposited materials.

In other words, in the reactor-rinsing configuration depicted in FIG. 2, the interface system 100 may establish a fluid connection between the reactor 102 and the HPLC unit 200 via prompting the switching valves 112 and 114 to assume operational states B to enable only cleaning of the reactor 102. While the interface system 100 assumes the reactor-rising configuration, the interface system 100 may control whether a liquid may flow through the reaction-product separator 104 or not via controlling the state of the closing valve 116. For instance, if the interface system 100 prompts the closing valve 116 to the open state, the rinsing liquid may only pass through the reactor 102, i.e., while the closing valve 116 is in the open state, (substantially) no fluid may flow from the tubing 12 to the separator 104. This approach may be advantageous, as it may allow to clean only the reactor 102 (and not the reaction-product separator 104), which is the component most prone to clogging. Therefore, having the possibility of guiding the rinsing liquid through the reactor only may allow, for example, supplying the rinsing liquid with a higher pressure than the operational configuration described in FIG. 1. Furthermore, it may allow to use rinsing liquids with more aggressive properties, such as acidic solutions.

Moreover, the approach depicted in FIG. 2 may be advantageous, as it may allow to use higher flow rates and pressures to clean the reactor 102 since (substantially no) liquid flow enters the reaction-product separator 104, which is the pressure and flow limiting component. Thus, it may be possible to use pressures up to 100 bar and flows up to 2 mL/min for cleaning the reactor 102. The rinsing liquid may flow from the HPLC unit 200 through the tubing 10 to the end of the reactor 102 and backflush the reactor 102. The rinsing liquid may remove contaminants and the contaminant-containing rinsing liquid may then be transported through the tubing 12 to the waste collector 120. When the closing valve 116 is in the open state, the flow of liquid through the reaction-product separator 104 may be prevented due to the small inner diameter of the reaction-product separator 104, which may ensure that (substantially) all of the liquid guided through the tubing 12 is directed to the waste collector 120.

The interface system 100 may monitor the liquid being guided to the waste 120 by means of the monitoring unit 122, and may measure properties of the liquid. For instance, the interface system 100 may prompt the monitoring unit 122 to measure a given property of the liquid, e.g. turbidity, within a time interval. Furthermore, the interface system 100 may prompt a user of the interface system 100 to set an initial time interval $t_0$.

The monitoring unit 122 may then monitor the liquid before it goes to waste in the defined time interval $t_0$. In embodiments, the interface system 100 may re-adjust the time interval $t_0$ based on the results of a previous measurement. In other words, the interface system 100 may prompt a user to input an initial time interval $t_0$ for measuring a given set of properties of the liquid passing through the monitoring unit 122, which may yield an initial set of results $r_0$. Based on this initial set of results $r_0$, the interface system 100 may change the initial time interval $t_0$ to a different time interval $t_1$, which may yield a set of results $r_1$. Subsequently, based on the set of results $r_1$, the interface system 100 may further adjust the time interval to $t_n$, which may yield a set of results $r_n$. For example, when the system 100 determines by means of the monitoring system 122 that impurities start to build in the system, the monitoring system 122 may be prompted to monitor the composition of the liquid more frequently. Thus, the system 100 can react more promptly in case a critical level of impurities is detected.

In other words, the interface system 100 may implement an automated cleaning procedure. The interface system 100 may monitor and control requirements of the cleaning procedure via the monitoring unit 122 and data analysis of the measurements executed by the monitoring unit 122 via a computer-implemented data analysis. This approach may allow the interface system 100 to monitor critical parameters, which may indicate that a clogging or contamination event may be taking place. For instance, the interface system 100 may determine that a clogging event is occurring based on, for example, measurements of pressure, flow rate, particle load, chemical composition, and when necessary, the system interface system 100 may trigger a cleaning procedure or may display via a terminal a notification to a user that the cleaning procedure is required.

In other words, for example, the pressure of a liquid flowing in the interface system 100 may be measured to indicate a clogging event when a given percentage of pressure increase is observed in comparison to the starting system pressure. Furthermore, to evaluate and estimate the clogging level, the system interface system 100 may monitor, e.g., the pressure in the system or a drop rate of the liquid at the waste collector 120, or any combination thereof. For the detection of contamination, the interface system 100 may monitor the chemical composition and/or the particle load of the liquid.

This approach may be advantageous, as it may allow the interface system 100 to automatically determine when the reactor-rinsing state may be required to be initiated or terminated, i.e. the interface system 100 may automatically control the reactor-rinsing state. Once the set of results r reaches a results' parameter range, the interface system 100 may terminate the reactor-rinsing state. Therefore, the results' parameter range required for terminating the reactor-rising state may be referred to as reactor-rinsing-state-terminating parameters.

Furthermore, it should be understood that the interface system 100 may prompt a user to input the reactor-rinsing-state-terminating parameters and/or the interface system 100 may comprise one or a plurality of computer-implemented data analysis algorithms that may provide the interface system 100 with sufficient input to trigger the termination of the reactor-rinsing state.

That is, stated generally, FIG. 2 depicts a second operation state of the interface 100. As discussed, FIG. 1 depicts a normal operation mode of the system 100 where components of a sample can react in the reactor to yield a reaction product and the reaction product can be separated from the remainder of the liquid in the separator 104 for detection by a detection unit 300 (FIG. 1). FIG. 2 depicts a configuration where the reactor 102 can be rinsed or washed. Preferably, this rinsing or washing is performed with a liquid flowing through the reactor 102 in a direction which is opposite to the flow direction through the reactor in the configuration depicted in FIG. 1. More particularly, a rinsing liquid may enter the interface system 100 and be guided via the first valve 112 and via the second valve 114 to the reactor 102. It may then be guided through the reactor 102, through the mixing unit 106, and further via the first valve 112, via the closing valve 116 towards the waste receptacle 120. It will be understood that this configuration allows the reactor 102 to be rinsed using a backward flush.

Figure 3:
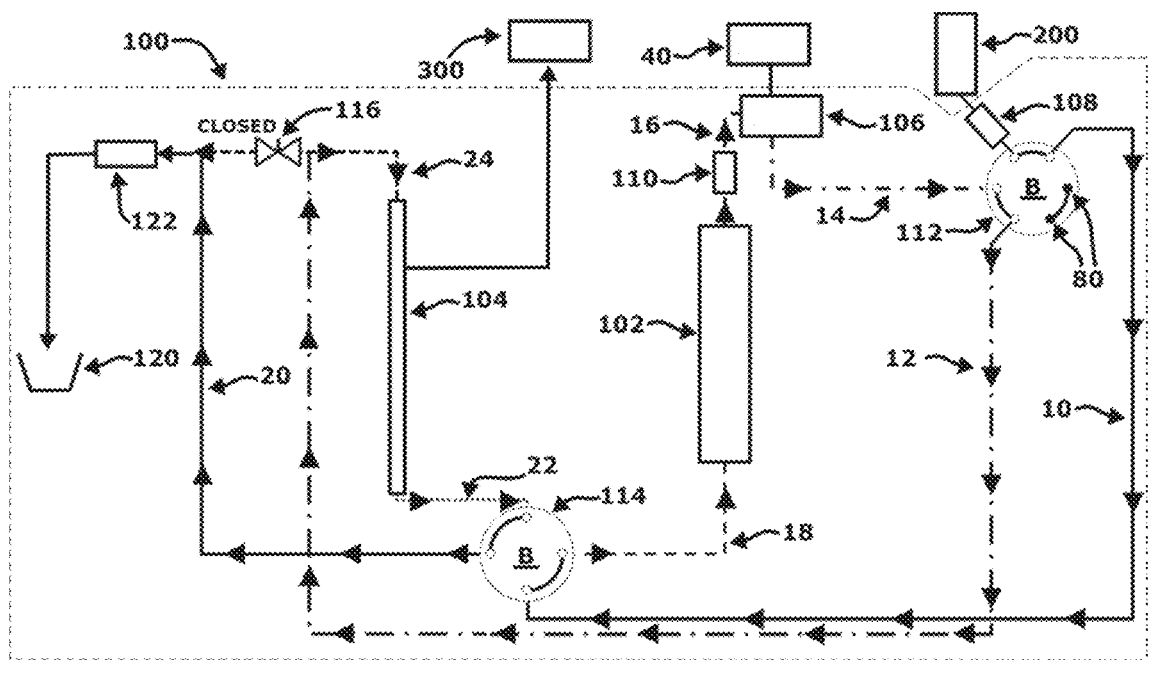
FIG. 3 depicts the interface system assuming a third state according to embodiments of the present invention.

FIG. 3 depicts the interface system 100 assuming a third state according to embodiments of the present invention. In simple terms, the third state may comprise the interface system 100 prompting the first switching valve 112 and the second switching valve 114 to assume the operational configurations B. Furthermore, the interface system 100 may prompt the closing valve 116 to assume a "closed" operational configuration.

In this state, the interface system 100 may establish a fluid connection between the HPLC unit 200 and the reactor 102. Generally, when considering the flow of fluid from the first switching valve 112, the considerations as discussed above with connection to FIG. 2 apply up to the point where the tubings 12 and 24 meet. Furthermore, as a result of the closing valve 116 being in the closed configuration, the liquid exiting the reactor 102 may be guided into the reaction-product separator 104, wherein the liquid may enter through an end of the reaction-product separator 104 in a flow direction opposite to the separator flow, so that it may backflush the reaction-product separator 104. In other words, when the liquid arrives at the intersection of the tubings 12 and 24, it cannot enter the "direct" flow path towards the waste receptacle 120, as the closing valve assumes the closed state. Thus, the liquid travels through the separator 104 (in a direction opposite to the normal analytical mode), through the second switching valve 114 and towards the waste receptacle 120.

In other words, the closing valve 116 may force the liquid exiting the reactor 102 to flow through the reaction-product separator 104, flushing the reaction-product separator 104 backwards. Through tubing 20 the liquid may be led to the waste collector 120. Here, the maximum pressure (in the separator 104) may not exceed the operating pressure as well as the operating flow (0.5-1.5 mL/min) used in FIG. 1, due to the inner diameter and stability of the reaction-product separator 104, i.e. as the reaction-product separator 104 may comprise a smaller inner diameter than the inner diameter of the reactor 102, the pressure and flow entering the reaction-product separator 104 may be required to be lower than when a liquid is entering only the reactor 102.

In one embodiment, the operational states assumed by the interface system 100 may be controlled via software, and monitoring routines may make sure that the cleaning time of reactor 102 is long enough to flush all contaminants, e.g. particles, into the waste collector 120 before switching to the next mode, e.g. before switching to the operational state for analysis of a sample, such as the one described in FIG. 1. The end of a single routine may be determined via different methods, such as, but not limited to, time, pressure, flow rate, particle load, chemical composition, etc. Therefore, as described above, the rinsing liquid guided through the reactor 102 and the separator 104 may also be monitored following a similar approach as described for the state depicted in FIG. 2, i.e. the interface system 100 may prompt a user to input an initial time interval $t_0$ for measuring a given set of properties of the liquid passing through the monitoring unit 122, which may yield an initial set of results $r_0$. Based on this initial set of results $r_0$, the interface system 100 may change the initial time interval $t_0$ to a different time interval $t_1$, which may yield a set of results $r_1$. Subsequently, based on the set of results $r_1$, the interface system 100 may further adjust the time interval to $t_n$, which may yield a set of results $r_n$. Once the set of results r reaches a results' parameter range, the interface system 100 may terminate reactor-reaction-product-separator-rinsing state. Therefore the results' parameter range required for terminating the reactor-reaction-product-separator-rising state may be referred to as reactor-reaction-product-separator-rinsing-state-terminating parameters, and it should be understood that the interface system 100 may prompt a user to input the reactor-reaction-product-separator-rinsing-state-terminating parameters and/or the interface system 100 may comprise one or a plurality of computer-implemented data analysis algorithms that may provide to the interface system 100 with sufficient input to trigger the termination of the reactor-rinsing state. If after a time interval $t_n$, the liquid monitored by the monitoring unit 122 does not reach a required composition, e.g. a concentration of a contaminant comprise by the liquid does not reach an acceptable minimum for the step of cleaning the interface system 100 to be considered successful, the interface system 100 may display a warning to the user.

In other words, the operational state depicted in FIG. 3 may allow the interface system 100 to guide a liquid, for instance, a rising liquid, through the reactor 102 and the reaction-product separator 104 in a flow direction opposite to the flow reactor flow and separator flow, which allows the interface system 100 to rinse the reactor 102 and the reaction-product separator 104 to eliminate or at least to reduce clogging materials. This may be advantageous, as it may allow to reach or maintain an optimal performance of the interface system 100.

Figure 4:
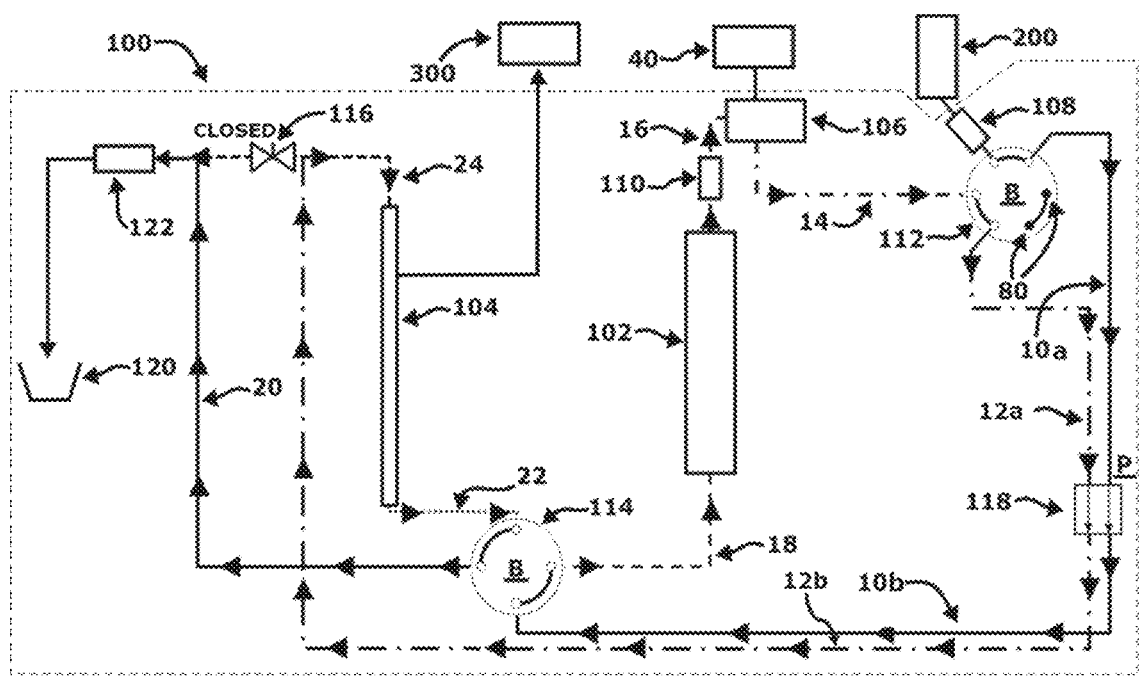
FIG. 4 depicts an analytical system with an interface system comprising a flow-switching valve according to embodiments of the present invention.
Figure 5:
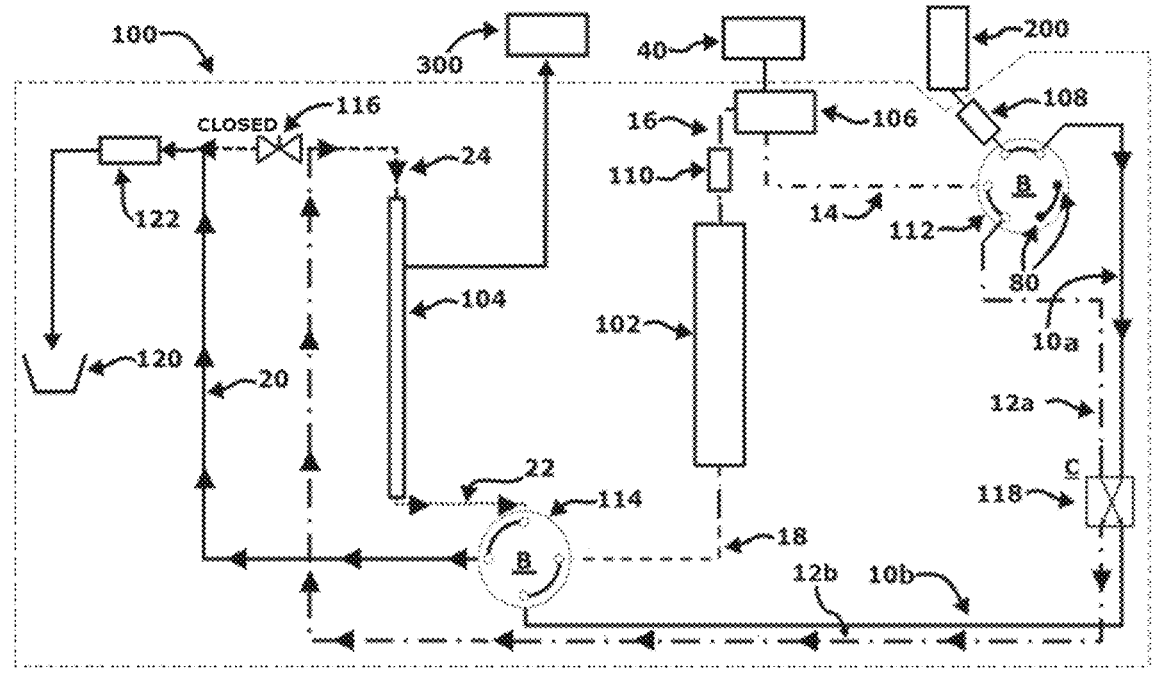
FIG. 5 depicts an interface system comprising a flow-switching valve assuming a state according to embodiments of the present invention.

FIGS. 4 and 5 depict a further variant of the interface system 100 discussed in conjunction with FIGS. 1 to 3. The interface system 100 comprises the components discussed above in conjunction with FIGS. 1 to 3. Furthermore, the interface system 100 comprises a flow-switching valve 118 connected to tubings 10, 12. The flow-switching valve 118 may be positioned between the switching valve 112 and the second switching valve 114. The flow-switching valve 118 may assume different operational states and therefore, the flow-switching valve 118 may further allow the interface system 100 to guide a liquid following different paths within the interface system 100.

More particularly, the flow-switching valve 118 may assume an operational state P, which may also be referred to as first operational state P, first operational configuration P, operational configuration P, or simply as state P or configuration P. For example, the flow-switching valve 118 is in this first operational state P in FIG. 4.

The flow-switching valve 118 may also assume an operational state C, which may also be referred to as second operational state C, second operational configuration C, operational configuration C, or simply as state C or configuration C. For example, the flow-switching valve 118 is in this second operational state C in FIG. 5.

In one embodiment, the flow-switching valve 118 may comprise a 4-port valve comprising a first connector, a second connector, a third connector, and a fourth connector. In the state P (see FIG. 4), the flow-switching valve 118 may fluidly connect the first connector to the third connector and the second connector to the fourth connector.

In the state C (see FIG. 5), the flow-switching valve 118 may fluidly connect the first connector to the fourth connector and the second connector to the third connector.

For instance, when the flow-switching valve 118 is in the state P, the interface system 100 may establish a fluid connection between HPLC unit 200 and the reactor 102, which may allow, for example, guiding a rinsing liquid through tubing 10 to the reactor 102 to remove clogging contaminants that may be present inside the reactor 102. Furthermore, while in the state P, the interface system 100 may control whether to guide the rinsing liquid exiting the reactor 102 subsequently to the product-reaction separator 104 or to the waste collector 120. The interface system 100 may guide the rinsing liquid to the reaction-product 104 or to the waste collector 120 via controlling the closing valve 116 as explained above. Here, when the closing valve 116 is in the open state, the rinsing liquid may exit the reactor 102 and be guided directed to the waste collector 120 without passing through the reaction-product separator 104. However, when the closing valve 116 assumes the closed state, the rinsing liquid exiting the reactor 102 may first in a reverse flow pass through the reaction-product separator 104, and the rinsing liquid exiting the reaction-product separator 104 may then be guided to the waste collector 120.

In other words, it will be understood that the configuration assumed by the interface system 100 in FIG. 4 mostly corresponds to the configurations discussed above in conjunction with FIGS. 1 to 3. More particularly, in the embodiment in FIGS. 4 and 5, the tubing 10 connecting the first switching valve 112 and the second switching valve 114 comprises two tubing sections 10a, 10b, and the tubing 12 connecting the first switching valve 112 and the tubing 24 comprises two tubing sections 12a, 12b. The flow-switching valve 118 either connects the tubing section 10a to tubing section 10b and tubing section 12a to tubing section 12b (as in FIG. 4) or the tubing section 10a to tubing section 12b and the tubing section 10b to 12a (as in FIG. 5).

Again, it will be understood that when the flow-switching valve 118 assumes the configuration depicted in FIG. 4, the system may be operated in the manner described above in conjunction with FIGS. 1 to 3.

FIG. 5 depicts the interface system 100 with the flow-switching valve 118 in the state C. If the first switching valve 112 and the second switching valve 114 assume their states B (as depicted in FIG. 5), and the flow-switching valve 118 is in the state C, the interface system 100 may establish a fluid connection between the HPLC unit 200 and the reaction-product separator 104, while keeping the reactor 102 decoupled.

In other words, the interface system 100 may cause the first switching valve 112 to assume the operational state B, which may allow the interface system 100 to guide a liquid supplied by the HPLC unit 200 through the tubing section 10a. The flow-switching valve 118 may assume the operational state C, which may allow the interface system 100 to guide the liquid from the tubing section 10a to the tubing section 12b and further to tubing 24 (as the closing valve 116 is closed), and through the reaction-product-separator 104. It will be noted that in this configuration, the liquid will flow through the separator 104 in a direction opposite to the flow direction during "normal" operation. From the separator 104, the liquid may flow to the second switching valve 114 (which may be in the operational state B) and then further towards the waste collector 120.

In other words, if the first switching valve 112 and the second switching valve 114 are in their operational states B, the interface system 100 may establish a fluid connection between the HPLC unit 200 and the reaction-product separator 104. However, while the flow-switching valve 118 is in the state C, no fluid connection may be established with the reactor 102, which may be advantageous, as the interface system 100 may guide a rinsing liquid, if required, only through the reaction-product separator 104. This may be particularly useful in a plurality of situations, for instance, when the reaction-product separator 104 requires a rinsing liquid with a specific composition to eliminate any clogging contaminant. The rinsing liquid exiting the reaction-product separator 104 may subsequently be guided to the waste collector 120. That is, the configuration depicted in FIG. 5 allows the separator 104 to be rinsed separately, i.e., without simultaneously rinsing the reactor 102.

It should be understood that independently from the path that a liquid follows in the interface system 100, e.g. passing only through the reactor 102 or passing through the reactor 102 and the reaction-product separator 104, it may always be possible to monitor the composition of liquid in the interface system 100 through the monitoring unit 122. The monitoring unit 122 may be configured for monitoring the composition of any liquid being guided to the waste collector 120, such as ions in solution that may be responsible for clogging components of the interface system 100, e.g. carbonates, sulfates, phosphates, etc. Therefore, the monitoring unit 122 may comprise one or more detectors, which may be configured to detect and quantify one or a plurality of contaminants.

In one embodiment, the monitoring unit 122 may be configured to detect particles in solution and may further be able to monitor changes in the particle load in the liquid, e.g. the monitoring unit 122 may comprise a unit configured to measure changes in the liquid. For instance, the monitoring unit 122 may be configured to monitor changes of the particle load of a circulating liquid via, for example, a dynamic light scattering unit.

In one embodiment, when no measuring or cleaning procedure is being conducted, the interface system 100 may also simply guide a liquid, for example, comprising one or more solvents, through its components in order to keep the components wetted. This approach may also be referred to as stand-by state. In the stand-by state the interface system 100 may also, for example, keep constant the temperature of the interface system 100. Such a stand-by state may be advantageous, as it may allow increasing the lifetime of parts and reduces the time for restarting the system.

In the above, particular interface systems 100 have been described connecting a sample-supply, e.g., a chromatography unit 200, to a detector 300. This interface system 100 may comprise inter alia a filter unit 108 (e.g., a guard column) which is located downstream of the chromatography unit 200, which filter unit 108 may hinder at least parts of the contaminants from entering components downstream of the filter unit 108. While this filter unit 108 may be useful in the interface systems 100 described above, it may also be used independently, as will be described below in conjunction with FIG. 6.

Figure 6:
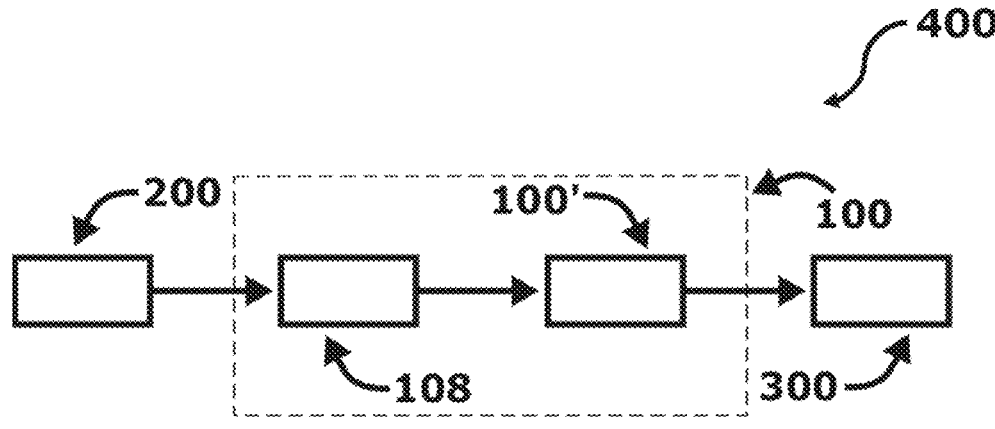
FIG. 6 depicts a protection system according to embodiments of the present invention.

FIG. 6 depicts a protection system 400 according to embodiments of the present invention. In simple terms, the protection system comprises a filter unit 108 arranged downstream of the chromatography unit 200 and upstream of an analytical device 300.

In FIG. 6, the filter unit 108 is depicted as a component of an interface system 100, therefore fluidly connected upstream of the other components comprised by the interface system 100, which other components of the interface system 100 are conceptually identified with reference numeral 100'. However, it should be understood that the filter unit 108 may also comprise a standalone unit which may be fluidly connected downstream of the HPLC unit 200 and upstream of the interface system 100.

In one embodiment, the filter unit 108 may comprise a guard column or a suppressor unit. The guard column or suppressor unit may be used for capturing interfering ions that may be comprised in a liquid, such as ions comprised by buffer solutions, salts, etc. Therefore, such a column may be advantageous, as it may allow selective reduction or elimination of chemical species that may result in problems for a component fluidly connected downstream to the filter unit 108, e.g. the other components 100' of the interface system 100 and/or the analytical unit 300.

For instance, isotope-ratio analysis of sugar in honey probes may require chromatographic separation into single components of a plurality of substances contained in a honey probe, e.g. different sugars comprised by honey probes may need to be separated in a liquid chromatography unit 200. In other words, a honey probe may be considered to be a matrix comprising a plurality of individual analytes, which may be required to separate to measure properties of the individual analytes, such as their isotope-ratio. Components of the honey probe may be separated in the chromatography unit 200 and pumped into the interface system 100.

In the interface system 100, the liquid supplied by the chromatography unit 200, i.e. the eluate containing the analytes, may be mixed with reagents which may convert the dissolved analytes to a defined chemical structure, for example a gas such as $CO_2$. The produced gas may be then passed to analytical device 300, e.g. an isotope-ratio mass spectrometer, where the isotopic ratio may be analyzed (as also described above in conjunction with FIGS. 1 to 5).

The chromatography unit 200 (which may also be referred to as chromatography assembly 200) may comprise a liquid chromatography unit 200, which may make use of a separation column for separation of the honey probe into individual substances. For example, the liquid chromatography unit 200 may be a high-performance liquid chromatography (HPLC) unit 200, which may comprise an ion-exchange column for separation of analytes contained in the honey probe. Such a separation column may lead, as a result of, for example, an ion-exchange process, to a column bleed. In case of an ion-exchange column, the column bleed may comprise introducing diverse ions depending on the type of column, e.g. cations such $Ca^{2+}$, which may be flushed out of the column and carried out via the mobile phase, most likely, along as the analyte, i.e. it may be transferred into an eluate that later may be fed to a subsequent component, such as the interface system 100 or the analytical device 300.

Introduction of ions into, for example, the interface system 100 (and particularly to the components 100' other than the filter unit 108) may result in clogging problems, as ions, such as $Ca^{2+}$, may react with other substances available in the interface system 100 either as reagents or by-products in, for example, the reactor 102, which may lead to formation of insoluble products, e.g. insoluble salts such as calcium phosphates and/or calcium sulfates. Insoluble products, and also products with a low or limited solubility, may lead to formation of, for example, particles, which may further lead to clogging of systems, e.g. components of the interface system 100 such as the reactor 102.

In other words, when analyzing certain samples, it may be necessary to separate the sample into a plurality of compounds of interest. For example, in honey analysis, the different sugars in the honey sample may be chromatographically separated in the liquid chromatography unit 200. For this purpose, ion-exchange columns may be used, which may utilize ion-exchange effects between analyte and column material. Such ion-exchange columns may comprise, for example, a cation exchanger, an anion exchanger, etc. Even though a plurality of columns types may be used, in most cases of honey analysis, $Ca^{2+}$ (cation) exchanger columns may likely be used. During separation of the analytes, it may happen that small amounts of cations from the cation exchange column may additionally be dissolved in the eluate. The eluate comprising the separated analytes (and possible cations bled from the cation exchanger) may further be passed from the liquid chromatography unit 200 to interface system 100 and mixed with reagents to quantitatively convert the analytes to $CO_2$, which means that water, analytes, small amounts of ions flushed out from the chromatographic column (e.g. $Ca^{2+}$) as well as, for example, phosphoric acid may be present in the combined liquid phase. This mixture may then be heated inside of the reactor 102 to form $CO_2$ for analysis in the analytical unit 300. However, as a side effect, the ions and, for example, phosphate (from phosphoric acid) and/or sulfates (from sodium peroxodisulfate), may be prone to react to produce insoluble salts, which can form particles. The particles from these insoluble salts can then clog parts inside of the interface system 100, which can lead to clogging and consequently (expensive) malfunctions.

Therefore, the filter unit 108 may allow reducing clogging effects that may arise from the column bleed, such as ion-bleeding from ion-exchange column of the liquid chromatography unit 200. For instance, the filter unit 108 may allow trapping out interfering ions, such as calcium cations, that may be transported by the liquid exiting the liquid chromatography unit 200, before entering components 100' of the interface system 100 further downstream. In other words, the filter unit 108 may provide means to eliminate or at least reduce the content of interfering ions in the liquid being fed to components 100' the interface system 100.

In one embodiment, the filter unit 108 may be arranged within tubings fluidly connecting the liquid chromatography unit 200 and further components 100' of the interface system 100.

The filter unit 108 may comprise suitable dimensions, which may be chosen to efficiently remove a given interfering ions without jeopardizing other operational parameters, such as chromatographic separation power and/or peak shape.

In other words, FIG. 6 depicts a protection system 400 comprising a filter unit 108, which filter unit 108 may or may not be comprised by the interface system 100. The protection system may be fluidly connected downstream to a chromatography unit 200 and upstream to an analytical device 300. In other words, the filter unit 108 may work as a filter or trap configured to filter or trap interfering substances, i.e. substances that may be comprised by the liquid supplied by the chromatography unit 200 to the analytical device 300. The filter unit 108 may further be configured to selectively filter or trap interfering substances, i.e. the type of filter unit 108 may be chosen to only eliminate or reduce a specifically target substances or contaminant. For instance, the filter unit 108 may be configured to target only divalent cations, e.g. $Ca^{2+}$.

In other words, the protection system may comprise an additional device, the filter unit 108, which may be arranged within a liquid transfer line downstream of the liquid chromatography unit 200 and upstream of other components 100' of the interface system 100. The filter unit 108 may work as filter or trap for eliminating or reducing interfering substances, but without affecting the analytes composition, separation and/or isotopic ratio. Furthermore, depending on the interfering substances, the filter unit 108 may be chosen to only eliminate specifically interfering substance.

In one embodiment, the filter unit 108 may comprise a protection column, which may also be referred to as guard column 108. The guard column 108 may be configured for capturing interfering substances, such as ions. Therefore, the present embodiment may allow implementing a protection means that may allow to prevent the formation of insoluble products via eliminating or reducing species that may result in insoluble salts. Thus, the present embodiment may allow preventing or minimizing clogging of the system.

The filter unit 108 may allow implementing a method for protecting the downstream components 100' of the interface system 100. In one embodiment, such a method may comprise identifying (potentially) clogging substances or precursors that may allow the occurrence of the clogging substances, e.g. the method may allow identifying ionic compounds that may lead to insoluble products that may be built up in the interface system 100 and subsequently lead to clogging in the interface system 100.

Furthermore, the filter unit 108 may provide means to remove contaminants from a liquid before being fed to the downstream components 100' of the interface system 100. Such contaminants may, for example, comprise cations such as $Ca^{2+}$, $Na^{2+}$, $K^+$, salts such as phosphates, or other harmful substances such as silica particles. The removal of the contaminants may comprise a plurality of different approaches, for example, but not limited to, trapping of ions, filtering or particles, precipitation of ions (capable of forming insoluble product) by addition of reagents, precipitation of undesired molecule by addition of solvents, e.g. precipitation of a given compound by addition of solvent with a different polarity, and/or by changing the pH of the liquid in order to precipitate a specific specie present in solution. Therefore, the filter unit 108 may be used as well as a trap or as filter. Alternatively or additionally, the filter unit 108 may comprise a supply unit configured to supply or add solvents or reagents to the liquid to eliminate the contaminant.

Moreover, the approach of the filter unit 108 may be advantageous, as it may allow to implement the protection system for a plurality of diverse interface systems 100 independently from the treatment that the liquid containing the analyte may receive in the interface system 100.

In other words, the protection system depicted in FIG. 6 may allow, inter alia, eliminating causes for clogging in the interface system 100, reducing the concentration of contaminants eluting from the separation column of the chromatography unit 200 below a critical level, which may allow preventing formation of insoluble substances. Furthermore, such an approach may result in a longer lifetime of the interface system 100 as a consequence of a reduced system/components clogging.

Moreover, the approach of the present invention may allow the interface system 100 to solve critical clogging while analyzing a sample, e.g. a honey sample, by an HPLC unit 200. For instance, the filter unit 108 may allow to remove contaminant from a liquid, e.g. the eluate of the HPLC unit 200, before entering downstream components 100' of the interface system 100. Additionally or alternatively, the filter unit 108 may allow filtering contaminants from the liquid without affecting the analyte separation, composition and isotope ratio. Therefore, the filter unit 108 may be introduced to capture contaminants and may further be adapted to a plurality of analytical procedures. For example, the filter unit 108 may comprise a guard column that efficiently captures $Ca^{2+}$ ions from the eluate, preventing the formation of insoluble calcium salts, e.g. calcium sulfate and calcium phosphate, within the interface system 100. Furthermore, the filter unit 108 may provide a robust method which may be easy to install and to maintain, which may increase the lifetime of the interface system 100 and may reduce the amount of needed spare parts. Moreover, the filter unit 108 may contribute to a routine analysis performance of the interface system 100 due to reduced downtimes for maintenance.

It will be understood that the interface system 108 described in conjunction with FIG. 6 may be used in any of the embodiments discussed above in conjunction with FIGS. 1 to 5.

While in the above, a preferred embodiment has been described with reference to the accompanying drawings, the skilled person will understand that this embodiment was provided for illustrative purpose only and should by no means be construed to limit the scope of the present invention, which is defined by the claims.

Whenever a relative term, such as "about", "substantially" or "approximately" is used in this specification, such a term should also be construed to also include the exact term. That is, e.g., "substantially straight" should be construed to also include "(exactly) straight".

Whenever steps were recited in the above or also in the appended claims, it should be noted that the order in which the steps are recited in this text may be accidental. That is, unless otherwise specified or unless clear to the skilled person, the order in which steps are recited may be accidental. That is, when the present document states, e.g., that a method comprises steps (A) and (B), this does not necessarily mean that step (A) precedes step (B), but it is also possible that step (A) is performed (at least partly) simultaneously with step (B) or that step (B) precedes step (A). Furthermore, when a step (X) is said to precede another step (Z), this does not imply that there is no step between steps (X) and (Z). That is, step (X) preceding step (Z) encompasses the situation that step (X) is performed directly before step (Z), but also the situation that (X) is performed before one or more steps (Y1), . . . , followed by step (Z). Corresponding considerations apply when terms like "after" or "before" are used.

What is claimed is:

1. A method performed in an interface system, the interface system comprising a reactor, a reaction-product-separator, and a plurality of valves, the method comprising:

(a) receiving a liquid containing analytes from a chromatography unit upstream of the interface system;

(b) guiding the liquid containing analytes through a filter unit to cause one or more contaminants to be removed from the liquid containing analytes, wherein the filter unit is arranged in a liquid transfer line that is downstream of the chromatography unit and upstream of the interface system;

(c) guiding the liquid containing analytes from the filter unit to the interface system and through the reactor in a reactor forward flow direction, and causing a component comprised by the analytes to react to create a reaction product in the reactor, to thus create a post-reactor liquid comprising the reaction product, (d) guiding the post-reactor liquid from the reactor to the reaction-product-separator and through the reaction-product-separator in a separator forward flow direction, and separating the reaction product from the post-reactor liquid, to thus create a post-separator fluid, (e) guiding the separated reaction product to an analytical device, (f) guiding the post-separator fluid to a waste collector, and (g) guiding at least one rinsing liquid through at least one of the reactor or the reaction-product-separator in a reverse flow direction that is opposite of at least one of the reactor forward flow direction or the separator forward flow direction;

wherein the plurality of valves comprises a first switching valve, a second switching valve, and a closing valve configured to form:

a first state that guides the liquid containing analytes from the filter unit to the reactor, that guides the post-reactor liquid from the reactor to the reaction-product-separator, that guides the separated reaction product to the analytical device, and that guides the post-separator fluid to the waste collector;

a second state that guides the at least one rinsing liquid, in the reverse flow direction, through the reactor but not through the reaction-product-separator; and a third state that guides the at least one rinsing liquid, in the reverse flow direction, through the reactor and the reaction-product-separator;

wherein the closing valve is arranged between the reaction-product-separator and the waste collector, the closing valve configured to be open to form the second state and closed to form the third state.

2. The method according to claim 1, wherein the at least one rinsing liquid comprises a reactor rinsing liquid, and step (g) comprises guiding the reactor rinsing liquid through the reactor in the reverse flow direction that is opposite the reactor forward flow direction, wherein the reactor rinsing liquid enters the reactor with a pressure of at least 50 bar, and wherein the reactor rinsing liquid is guided through the reactor with a flow rate of at least 1 mL/min.

3. The method according to claim 1, wherein the at least one rinsing liquid comprises a reaction-product separator (RPS) rinsing liquid, and step (g) comprises guiding the RPS rinsing liquid through the reaction-product-separator in the reverse flow direction that is opposite the separator forward flow direction, wherein the RPS rinsing liquid enters the reaction-product-separator with a pressure not exceeding 6 bar, and wherein the RPS rinsing liquid is guided through the reaction-product-separator with a flow rate lower than 1.0 mL/min, but higher than 0.3 mL/min.

4. The method according to claim 1, wherein the at least one rinsing liquid comprises a reactor-RPS rinsing liquid, and step (g) comprises guiding the reactor-RPS rinsing liquid through the reactor and through the reaction-product-separator in the reverse flow direction that is opposite the reactor forward flow direction and the separator forward flow direction, wherein the reactor-RPS rinsing liquid is guided through the reactor and the reaction-product-separator with a pressure not exceeding 10 bar, and wherein the reactor-RPS rinsing liquid is guided through the reactor and the reaction-product-separator with a flow rate lower than 1.0 mL/min, but higher than 0.3 mL/min.

5. The method according to claim 1, wherein the method comprises detecting a need for cleaning, wherein the step of detecting the need for cleaning comprises monitoring at least one of a pressure of a liquid in the interface system, a flow rate of a liquid in the interface system, a droplet rate at an outlet of the interface system, a particle load of a liquid in the interface system, a chemical composition of a liquid in the interface system, and at least one physical parameter of a liquid in the interface system.

6. The method according to claim 1, wherein the method comprises triggering step (g), wherein the triggering of step (g) comprises one of automatically triggering step (g); and manually triggering step (g), wherein automatically triggering comprises at least one of triggering step (g) at a time t after an analytical run; or triggering step (g) when detecting a need for cleaning, and wherein manually triggering comprises prompting an input of a user for triggering step (g) when detecting the need for cleaning.

7. The method according to claim 1, wherein the method comprises executing step (c) and step (d) in the interface system as steps of an analytical run, and wherein the method comprises detecting the reaction product separated in step (d).

8. The method according to claim 1, wherein the method is for at least one of rinsing at least one component of the interface system, or wetting at least one component of the interface system.

9. An interface system, wherein the system is configured to perform the method according to claim 1, wherein the interface system comprises:

the reactor including an upstream inlet and a downstream outlet, the reaction-product-separator fluidly connected to the downstream outlet of the reactor and further comprising a reaction-product-separator outlet, the waste collector fluidly connected to the reaction-product-separator outlet, and the plurality of valves comprising the first switching valve, the second switching valve, and the closing valve, wherein the closing valve is arranged between the reaction-product-separator and the waste collector, the closing valve configured to be open to form the second state and closed to form the third state.

10. The interface system according to claim 9, wherein the interface system comprises at least one mixing unit configured to receive and mix at least two incoming liquids, and to provide a mixed liquid, wherein the interface system is further configured to supply the mixed liquid as the liquid containing analytes to the reactor through the upstream inlet.

11. The interface system according to claim 10, wherein the interface system comprises an inlet coupling for coupling the interface system with the chromatography unit and a plurality of coupling tubings including a first tubing arranged between the first switching valve and the second switching valve;

a second tubing arranged between the first switching valve and the closing valve;

a third tubing arranged between the first switching valve and the mixing unit;

a fourth tubing arranged between the mixing unit and the reactor;

a fifth tubing arranged between the reactor and the second switching valve;

a sixth tubing arranged between the second switching valve and the waste collector;

a seventh tubing arranged between the second switching valve and the reaction-product-separator; and an eighth tubing arranged between the reaction-product-separator and the closing valve.

12. The interface system according to claim 11, wherein the first switching valve is configured to assume a first operational state (A), wherein the mixing unit is fluidly connected to the chromatography unit, and the first tubing and the second tubing are connected to dead-ends, respectively; and a second operational state (B), wherein the chromatography unit is fluidly connected to the first tubing, and the mixing unit is fluidly connected to the second tubing, and wherein the second switching valve is configured to assume a first operational state (A), wherein the reactor is fluidly connected to the reaction-product-separator; and a second operational state (B), wherein the reactor is fluidly connected to the first tubing.

13. The interface system according claim 10, wherein the interface system further comprises a reactor filter unit, wherein the reactor filter unit is located between the mixing unit and the reactor, and wherein the reactor filter unit comprises at least one of:

a filtering element; and a guard column.

14. The interface system according to claim 9, wherein the interface system comprises a flow-switching valve configured to assume a first operational state (P) and a second operational state (C), wherein the flow-switching valve comprises a first connector, a second connector, a third connector, and a fourth connector, and wherein in the first operational state (P) of the flow-switching valve, the first connector is connected to the third connector and the second connector is connected to the fourth connector, and in the second operational state (C) of the flow-switching valve, the first connector is connected to the fourth connector and the second connector is connected to the third connector.

15. The interface system according to claim 14, wherein the interface system further comprises a monitoring unit arranged downstream of the closing valve and upstream the waste collector, wherein the monitoring unit comprises at least one of a pressure meter, a flowmeter, an ion-selective electrode, an ultraviolet-visible (UV-Vis) absorption spectrometer, an infrared (IR) absorption spectrometer, a light scattering (LS) spectrometer, an electrical conductivity meter, and a thermal conductivity meter.

16. The interface system according to claim 9, wherein the reaction-product-separator comprises a separator membrane comprising at least one of a polymer-electrolyte membrane, membrane tubes, a $CO_2$-separation membrane; and wherein the reactor is an oxidation reactor.

17. The interface system according to claim 9, wherein the reaction-product-separator is configured to separate carbon dioxide from the post-reactor liquid.

18. An analytical system comprising the interface system according to claim 9, the chromatography unit upstream of the interface system, and a mass spectrometer downstream of the interface system, and wherein the analytical system is configured to be pressurized to a pressure exceeding the ambient pressure by at least 500 bar.

19. The analytical system according to claim 18, wherein the mass spectrometer is configured and located to detect the reaction product.

* * * * *